(12) United States Patent
Chan et al.

(10) Patent No.: US 10,950,194 B1
(45) Date of Patent: Mar. 16, 2021

(54) DISPLAY PANEL WITH DISTRIBUTED DRIVER NETWORK

(71) Applicant: Solomon Systech (Shenzhen) Limited, Shenzhen (CN)

(72) Inventors: Wing Chi Stephen Chan, Hong Kong (HK); Chi Wai Lee, Hong Kong (HK); Pie Chih Ke, Hong Kong (HK); Johnkid Lo, Hong Kong (HK)

(73) Assignee: Solomon Systech (Shenzhen) Limited, Shenzhen (CN)

( * ) Notice: Subject to any disclaimer, the term of this patent is extended or adjusted under 35 U.S.C. 154(b) by 0 days.

(21) Appl. No.: 16/592,841

(22) Filed: Oct. 4, 2019

(51) Int. Cl.
*G09G 3/36* (2006.01)
*G09G 3/00* (2006.01)

(52) U.S. Cl.
CPC ........... *G09G 3/3648* (2013.01); *G09G 3/006* (2013.01); *G09G 3/3688* (2013.01); *G09G 3/3696* (2013.01); *G09G 2330/026* (2013.01); *G09G 2330/027* (2013.01)

(58) Field of Classification Search
CPC .... G09G 3/3648; G09G 3/3696; G09G 3/006; G09G 3/3688; G09G 2330/027; G09G 2330/026
See application file for complete search history.

(56) References Cited

U.S. PATENT DOCUMENTS

| | | | | |
|---|---|---|---|---|
| 8,058,815 B1* | 11/2011 | Hardy | ............... | H05B 45/00 315/291 |
| 8,362,705 B2* | 1/2013 | Mills | ............... | H05B 45/395 315/224 |
| 9,069,519 B1* | 6/2015 | Hall | ............... | F21V 23/023 |
| 9,704,430 B2* | 7/2017 | Li | ............... | G09G 5/006 |
| 9,747,872 B2* | 8/2017 | Li | ............... | G09G 5/395 |
| 9,812,059 B2* | 11/2017 | Li | ............... | G09G 5/006 |
| 10,593,256 B2* | 3/2020 | Li | ............... | G09G 3/32 |
| 2002/0163513 A1* | 11/2002 | Tsuji | ............... | G09G 5/006 345/204 |
| 2007/0139334 A1* | 6/2007 | Hong | ............... | G09G 3/3688 345/92 |
| 2007/0176919 A1* | 8/2007 | Yamashita | ............... | G09G 5/006 345/214 |

(Continued)

*Primary Examiner* — Grant Sitta
(74) *Attorney, Agent, or Firm* — Spruson & Ferguson (Hong Kong) Limited

(57) ABSTRACT

In a display panel, drivers for driving LEDs of pixels are distributed over a substrate, and transceivers relay pixel data from a timing controller to the drivers. The drivers are divided into groups. Respective drivers in a group receive corresponding pixel data addressed thereto solely from one corresponding transceiver. The corresponding transceiver and the respective drivers are daisy-chained to form one first linear daisy chain, where each pair of immediately-adjacent first drivers are connected. Plural first linear daisy chains are formed for all groups. The transceivers are daisy-chained to form a second linear daisy chain by connecting each pair of immediately-adjacent transceivers. The first and second linear daisy chains form a fishbone topology network to enable transmission of pixel data from the timing controller to the drivers while reducing a data-line footprint on the substrate that mounts the pixels, driver and transceivers in comparison to a conventional star-topology network.

20 Claims, 12 Drawing Sheets

(56) References Cited

U.S. PATENT DOCUMENTS

| | | | | |
|---|---|---|---|---|
| 2008/0024387 A1* | 1/2008 | Maskeny | ............... | G09F 9/3026 |
| | | | | 345/1.1 |
| 2008/0122832 A1* | 5/2008 | Chen | ........................ | G09G 3/32 |
| | | | | 345/214 |
| 2010/0128020 A1* | 5/2010 | Oh | ........................ | G06F 3/1446 |
| | | | | 345/213 |
| 2011/0199369 A1* | 8/2011 | Huang | ..................... | G09G 3/20 |
| | | | | 345/213 |
| 2011/0285763 A1* | 11/2011 | Bassi | .................. | G09G 3/2003 |
| | | | | 345/694 |
| 2012/0169708 A1* | 7/2012 | Wu | ..................... | G09G 3/2096 |
| | | | | 345/214 |
| 2013/0241859 A1* | 9/2013 | Saitoh | ..................... | G09G 5/04 |
| | | | | 345/173 |
| 2014/0168197 A1* | 6/2014 | Kobayashi | ............ | G09G 3/3648 |
| | | | | 345/212 |
| 2015/0042551 A1* | 2/2015 | Hsu | ...................... | G09G 3/2092 |
| | | | | 345/100 |
| 2015/0325164 A1* | 11/2015 | Kim | ..................... | G09G 3/3607 |
| | | | | 345/694 |
| 2016/0275835 A1* | 9/2016 | Yuan | ........................ | G09F 9/35 |
| 2017/0004761 A1* | 1/2017 | Yang | ....................... | G06F 3/147 |
| 2017/0365229 A1* | 12/2017 | Kwa | ....................... | G06F 3/147 |
| 2019/0377535 A1* | 12/2019 | Rycyna | .................. | H04L 12/28 |

\* cited by examiner

DISPLAY PANEL WITH DISTRIBUTED DRIVER NETWORK

LIST OF ABBREVIATIONS

2D Two-dimensional
EEPROM Electrically erasable programmable read-only memory
EMI Electromagnetic interference
GND Ground
IC Integrated circuit
ID Identification
LC Liquid crystal
LED Light emitting diode
OLED Organic LED
PCB Printed circuit board
PLL Phase locked loop
RLL Run length limited
TCON Timing controller

FIELD OF THE INVENTION

The present invention generally relates to a display panel. In particular, the present invention relates to a display panel having a distributed driver network mounted on a substrate for driving a plurality of light-generating pixels where the distributed driver network exhibits a reduced data-line footprint on the substrate.

BACKGROUND

In a display panel having an array of LEDs for backlight generation or for direct image generation, it is increasingly challenging to drive the LED array as the panel size increases. Driving the LED array is especially challenging when the display panel has a very large display area, e.g., when the display panel is used as a road-side advertisement board.

If the LED array is realized as a passive matrix, there is a limitation on the number of rows that a single LED driver can serve. The LED driver drives the LEDs row-by-row in a time multiplexing manner. As the number of rows increases, the maximum frame-refresh rate that can be supported decreases. It affects the smoothness in displaying moving pictures and also limits the maximum brightness each LED can provide. Usually, a single driver is limited to drive 200 rows of LEDs in the passive matrix. Realizing the LED array as an active matrix can partially solve the aforementioned issue. The active matrix allows the single LED driver to drive more rows, e.g., 1000 rows. However, as the panel size increases, a greater proportion of driving power from the LED driver is used in driving parasitic resistance and capacitance inherent in source electrodes that connect to LEDs rather than powering the LEDs. Furthermore, the maximum frame-refresh rate is inversely proportional to the number of rows, making it difficult to maintain the smoothness in displaying moving pictures if the LED driver is used to drive a large number of rows.

Due to the limitation on a practical number of rows that a single LED driver can drive, multiple LED drivers distributed over a large display panel are usually used to drive a LED array in the display panel. (In practice, the large display panel is often formed by assembling or cascading a number of smaller display panels together.) Each LED driver is used to drive LEDs in a portion of the LED array, where the LEDs are located close to this LED driver. The LED drivers drive the LEDs according to pixel data received from a TCON. Due to a large area on the display panel, transceivers are usually used to relay the pixel data between the TCON and the drivers. In the art, a star topology, as shown in FIG. 1 of CN206686288U, is usually used to network the TCON, the transceivers and the drivers for delivering the pixel data to respective drivers.

For illustration, FIG. 1 depicts a conventional display panel 100 using a star topology for networking a TCON 180, transceivers 141-146 and various drivers. The display panel 100 has a display area 105. The drivers (e.g., drivers 121-136) are distributed over the display area 105. Each driver is used to drive light-generating pixels (formed with a plurality of LEDs) installed on a portion of the display area 105. For example, a driver 156 is used to drive LEDs (e.g., LED 158) in a portion 160 of the display area 105. Each transceiver is used to relay the pixel data to drivers located over a region of the display area 105. For instance, the transceiver 141 is used to relay the pixel data to drivers 121-136 over the region 111 of the display area 105. In particular, the transceiver 141 and the drivers 121-136 are arranged under a star topology. The transceiver 141 addresses each of the drivers 121-136 independently through a first star-topology arrangement. All the transceivers 141-146 receive the pixel data from the TCON 180. The transceivers 141-146 and the TCON 180 are also arranged under the star topology. The TCON 180 addresses each of the transceivers 141-146 independently through a second star-topology arrangement.

A major disadvantage of using the star topology in networking the TCON, transceivers and drivers is that a lot of data lines are required to be installed in forming a star-topology network. It leads to a high data-line footprint on a substrate on which the pixels, transceivers and drivers are mounted. As one consequence of the high data-line footprint, the substrate is usually realized by a multi-layer PCB. Another consequence of the high data-line footprint is that usually, the front side of the display panel is populated with LEDs, source lines and scan lines while the back side thereof is populated with drivers, transceivers, power lines and data lines. Both consequences lead to a high cost in manufacturing the display panel.

There is a need in the art for a display panel having a distributed driver network with a low data-line footprint.

SUMMARY OF THE INVENTION

A first aspect of the present invention is to provide a display panel having a distributed driver network mounted on a substrate for driving a plurality of light-generating pixels.

The display panel comprises plural light-generating pixels; plural drivers collectively used for driving the pixels according to pixel data, the pixel data being arranged to be generated by a timing controller; plural transceivers collectively used for relaying the pixel data from the timing controller to the drivers, one of the transceivers being arranged to connect to the timing controller for receiving the pixel data; and a substrate on which the pixels, the drivers and the transceivers are mounted. The drivers are divided into plural groups of drivers, first drivers in an individual group being arranged to receive corresponding pixel data addressed thereto solely from a corresponding transceiver selected from the transceivers. The corresponding transceiver and the first drivers are daisy-chained and interconnected via a first number of one or more data lines to form a first linear daisy chain, the first drivers being daisy-chained by connecting each pair of immediately-adjacent first drivers to thereby enable transmission of the corresponding pixel data from the corresponding transceiver to the first drivers while reducing a data-line footprint on the substrate in comparison to a first star-topology arrangement of individually connecting the corresponding transceiver to each of the first drivers. The transceivers are daisy-chained and interconnected via a second number of one or more data lines to form a second linear daisy chain, the transceivers being daisy-chained by connecting each pair of immediately-adjacent transceivers to thereby enable transmission of the pixel data from the timing controller to the transceivers while further reducing the data-line footprint on the substrate in comparison to a second star-topology arrangement of individually connecting the timing controller to each of the transceivers.

Preferably, the corresponding transceiver is configured to extract the corresponding pixel data from the pixel data received from the second linear daisy chain and then deliver the corresponding pixel data to the first drivers through the first linear daisy chain, causing the first number of one or more data lines to be operated at a first data rate less than a second data rate that the second number of one or more data lines are operated at, thereby enabling more reliable transmission of the pixel data to the drivers in comparison to broadcasting the pixel data from the timing controller unselectively to all the drivers.

According to one embodiment, the drivers are divided into the groups such that the first drivers in the individual group are substantially-linearly distributed on the substrate.

According to one embodiment, the pixels, the drivers and the transceivers are mounted on a same side of the substrate.

According to one embodiment, the first number is one so as to minimize the data-line footprint among different choices of the first number.

Preferably, each of the first drivers is configured to decode the corresponding pixel data that are encoded by a run length limited (RLL) code.

According to one embodiment, the second number is two such that the transceivers are daisy-chained and interconnected via a pair of data lines, and wherein the transceivers are configured to decode the pixel data that are serially transmitted with differential signaling over said pair of data lines.

Preferably, each of the transceivers is configured to decode the pixel data that are encoded by a run length limited (RLL) code.

The display panel further comprises a plurality of source lines for supplying driving currents from the drivers to the pixels; a plurality of scan lines for collecting the driving currents from the pixels, the plurality of source lines and the plurality of scan lines forming a pixel-driving network for driving the pixels by the drivers; a first plurality of data lines for interlinking the drivers and connecting the drivers to the transceivers; and a second plurality of data lines for interlinking the transceivers, the first and second pluralities of data lines forming a pixel-data distribution network for delivering the pixel data to the drivers. The pixels are arrayed along a first reference direction and a second reference direction perpendicular thereto, the plurality of source lines running generally along the second reference direction, the plurality of scan lines running generally along the first reference direction. The drivers are arrayed along the first and second reference directions, the first drivers in the individual group and the corresponding transceiver being substantially-linearly distributed on the substrate along the second reference direction, the first number of data lines running generally along the second reference direction, thereby configuring the first plurality of data lines to run generally along the second reference direction so as to facilitate the first plurality of data lines and the plurality of source lines to be compactly realized on a first layer. The transceivers are substantially-linearly distributed on the substrate along the first reference direction, the second number of data lines running generally along the first reference direction, thereby configuring the second plurality of data lines to run generally along the first reference direction so as to facilitate the second plurality of data lines and the plurality of scan lines to be compactly realized on a second layer.

Preferably, the pixels, the drivers and the transceivers are mounted on a same side of the substrate.

According to one embodiment, the first number is one so as to minimize the data-line footprint among different choices of the first number. The second number is two such that the transceivers are daisy-chained and interconnected via a pair of data lines. The transceivers are configured to decode the pixel data that are serially transmitted with differential signaling over said pair of data lines.

The display panel further comprises the timing controller for generating the pixel data and for assigning an identification (ID) number to each one of the transceivers and the drivers at initialization of the display panel, the ID number being used by the timing controller as an address in delivering the pixel data.

Preferably, an individual transceiver comprises a high-speed input data port, a high-speed output data port and a third number of one or more low-speed output data ports, wherein the high-speed input data port and the high-speed output data port are used in daisy-chaining the transceivers, and wherein when the individual transceiver is used as the corresponding transceiver in the individual group, one low-speed output data port is used in daisy-chaining the corresponding transceiver and the first drivers. The individual transceiver is configured to disconnect the high-speed output data port from the high-speed input data port at the initialization before any ID number is received at the high-speed input data port; adopt any ID number first received by the high-speed input data port as the ID number assigned to the individual transceiver; and connect the high-speed input data port and the high-speed output data port after the ID number assigned to the individual transceiver is received, thereby allowing subsequent ID numbers generated from the timing controller to pass to remaining transceivers for ID number assignment.

According to one embodiment, the third number is two such that the individual transceiver is usable for directly relaying the pixel data to two different groups; and the transceivers are positioned on the substrate such that the transceivers collectively divide the substrate into two portions, the individual transceiver being arranged to relay the pixel data to respective drivers in two different groups, the two different groups being respectively located on different portions of the substrate.

According to one embodiment, an individual driver comprises an input data port and an output data port, wherein when the individual driver is one of the first drivers in the individual group, the input data port and the output data port are used in daisy-chaining the corresponding transceiver and the first drivers; and the individual driver is configured to disconnect the output data port from the input data port at the initialization before any ID number is received at the input data port; adopt any ID number first received by the input data port as the ID number assigned to the individual driver; and connect the input data port and the output data port after the ID number assigned to the individual driver is received, thereby allowing subsequent ID numbers generated from the timing controller to pass to remaining first drivers in the individual group for ID number assignment.

The display panel further comprises plural liquid crystal (LC) cells, an individual LC cell overlying a respective pixel selected from the pixels, wherein the respective pixel is used for generating a backlight beam and the individual LC cell is used for controllably modulating a light intensity of the backlight beam.

Preferably, an individual pixel includes a plurality of light emitting diodes (LEDs) for color-light generation.

The display panel further comprises a solid-state memory for storing compensation data of different LEDs of the pixels, the compensation data being used in computing a driving-current level for driving an individual LED to achieve a desired luminance level; and the timing controller for generating the pixel data from dimming data, the timing controller being configured to generate the pixel data by scaling the dimming data according to the compensation data.

Preferably, the timing controller and the solid-state memory are mounted on the substrate.

A second embodiment of the present invention provides a liquid crystal (LC) display comprising the display panel functioned as a light emitting diode (LED) backlight; a diffuser; a LC layer having plural LC cells; and a color filter layer. The LC cells are grouped into a plurality of zones. Each zone of LC cells is configured to overlie a respective pixel selected from the plural light-generating pixels of the display panel. The respective pixel is used for generating a backlight beam for the zone, which is diffused by the diffuser to form a diffused light. Each of the LC cells is used for controllably modulating a light intensity of the diffused light and outputting a polarized light beam to the color filter layer for generating a color image; thereby increasing a dynamic range of the light intensity with more vivid colors.

Other aspects and advantages of the present invention are disclosed as illustrated by the embodiments hereinafter.

BRIEF DESCRIPTION OF THE DRAWINGS

The appended drawings, where like reference numerals refer to identical or functionally similar elements, contain figures of certain embodiments to further illustrate and clarify various aspects, advantages and features of the display panel as disclosed herein. It will be appreciated that these drawings depict only certain embodiments of the invention and are not intended to limit its scope. Skilled artisans will appreciate that elements in the figures are illustrated for simplicity and clarity and have not necessarily been depicted to scale.

DETAILED DESCRIPTION

As used herein, "a data-line footprint" means a percentage of a substrate surface being laid with data lines. Therefore, a high data-line footprint implies that the remaining area of the substrate surface usable for mounting with different ICs for performing desired functions is reduced.

As used herein, "a data line running generally along a direction" means a data line following a path such that at least 60% of the length of the path substantially follows the aforesaid direction. Hence, such data line has at least 60% of its length to be a straight line and to run along a dedicated direction. Despite such data line has occasional bends caused by, e.g., IC pins blocking a straight path intended to be followed by the data line, a major proportion of the data line being straight (greater than 60%) and running along one direction promotes reliable transmission of data.

Disclosed herein is a display panel having a reduced data-line footprint when compared to a conventional display panel realized with a star topology of arranging the TCON, transceivers, and drivers. The disclosed display panel is exemplarily illustrated with the aid of FIG. 2, which depicts a schematic diagram of a display panel 200 in accordance with certain embodiments of the present invention.

Figure 2:
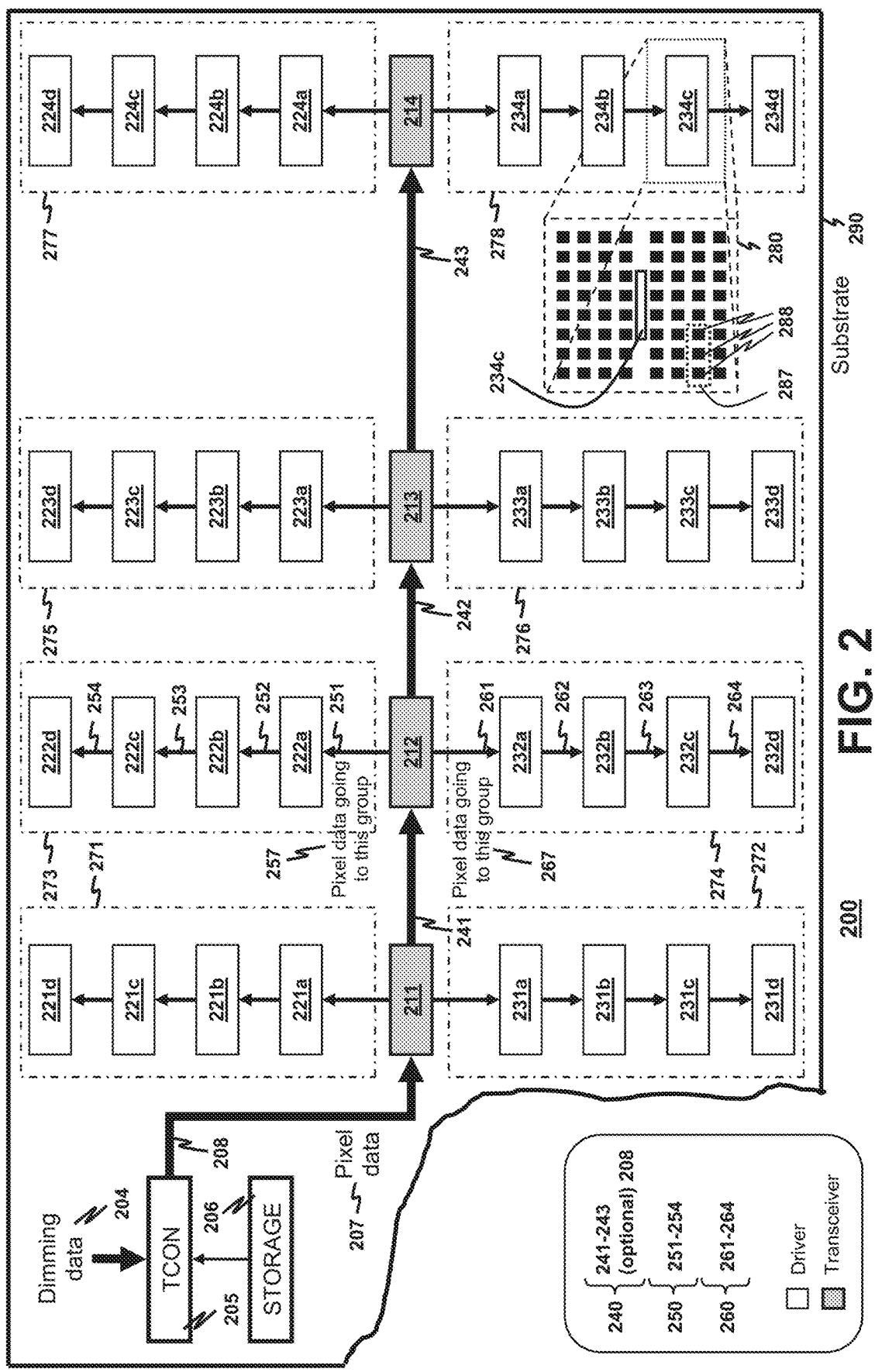
FIG. 2 depicts, in accordance with an exemplary embodiment of the present invention, a schematic diagram of a display panel realized with a fishbone topology network of transceivers and drivers.

For illustration of the present invention, the display panel 200 shown in FIG. 2 is selected to have 32 drivers and 4 transceivers. Nevertheless, the present invention is not limited only to these numbers of drivers or transceivers. Furthermore, the transceivers are located around the middle of the drivers as one practical realization of the disclosed display panel. In the present invention, nevertheless, each transceiver may be located at any location of the display panel as deemed appropriate by those skilled in the art according to practical situations. In the display panel 200, a rectangular display area is assumed such that a rectangular array of drivers is used for driving LEDs. The present invention is also applicable to a display panel having a display area that is irregularly shaped such that the drivers need not be arranged as a rectangular array. Those skilled in the art will appreciate that the details disclosed for the display panel 200 are easy to be extended to developing a display panel having an irregularly-shaped display area.

The display panel 200 comprises plural light-generating pixels (e.g., pixel 287), plural drivers 221a-d, 222a-d, 223a-d, 224a-d, 231a-d, 232a-d, 233a-d, 234a-d, plural transceivers 211-214, and a substrate 290. The pixels, the drivers 221a-d, 222a-d, 223a-d, 224a-d, 231a-d, 232a-d, 233a-d, 234a-d and the transceivers 211-214 are mounted on the substrate 290. An individual pixel includes one or more LEDs for light generation. Color light may be generated by using plural LEDs that generate different colors of light. For instance, the pixel 287 includes three LEDs 288 for respectively generating three primary colors. An individual LED may be a semiconductor-based LED, an OLED, a quantum-dot LED, a perovskite LED, etc. Each driver is used for driving pixels (or LEDs) around this driver. For instance, the driver 234c is arranged to drive LEDs located on a region 280 of display area. The drivers 221a-d, 222a-d, 223a-d, 224a-d, 231a-d, 232a-d, 233a-d, 234a-d are collectively used for driving the pixels according to pixel data 207, and are distributed on the substrate 290 to form a distributed driver network. A TCON 205 is used for generating the pixel data 207. The transceivers 211-214 are collectively used for relaying the pixel data 207 from the TCON 205 to the drivers 221a-d, 222a-d, 223a-d, 224a-d, 231a-d, 232a-d, 233a-d, 234a-d. In addition, one of the transceivers 211-214 is arranged to connect to the TCON 205 for receiving the pixel data 207. As one embodiment as shown in FIG. 2, the transceiver 211 is connected to the TCON 205 through a link 208. The transceiver 211 is located at one end of a serial cascade of the transceivers 211-214.

The drivers 221a-d, 222a-d, 223a-d, 224a-d, 231a-d, 232a-d, 233a-d, 234a-d are divided into plural groups 271-278 of drivers. For instance, the groups 271 and 272 consist of the drivers 221a-d and 231a-d, respectively. Grouping of the drivers 221a-d, 222a-d, 223a-d, 224a-d, 231a-d, 232a-d, 233a-d, 234a-d may be based on a certain rule as deemed appropriate by those skilled in the art according to practical situations. As one example, the rule may be that all the groups equally divide an entirety of drivers and that each group forms a cluster of neighboring drivers that are closely located together. In certain embodiments, the drivers 221a-d, 222a-d, 223a-d, 224a-d, 231a-d, 232a-d, 233a-d, 234a-d are divided into the groups 271-278 such that respective drivers (hereinafter referred to as first drivers for simplicity of presentation) in an individual group are substantially-linearly distributed on the substrate 290. In this arrangement of the individual group, data lines linking the first drivers can be laid down on the substrate 290 as substantially straight lines, simplifying routing of the data lines on the substrate 290 and hence simplifying design of the display panel 200.

In one arrangement of the transceivers 211-214 as shown in FIG. 2, the transceivers 211-214 are positioned on the substrate 290 such that the transceivers 211-214 collectively divide the substrate 290 into two portions. Each of the transceivers 211-214 is arranged to relay the pixel data 207 to respective drivers in two different groups. The two different groups are respectively located on different portions of the substrate 290. Nevertheless, the present invention is not limited only to the aforementioned arrangement in the transceivers 211-214.

Exemplarily, the first drivers in the individual group are arranged to receive corresponding pixel data addressed to the first drivers solely from a corresponding transceiver selected from the transceivers 211-214. For illustration, consider the group 273. The corresponding transceiver that sends the corresponding pixel data to the group 273 is the transceiver 212, where the corresponding pixel data are pixel data 257. Also consider the group 274. The corresponding transceiver for the group 274 is also the transceiver 212. The corresponding pixel data addressed to the drivers 232a-d, all of which belong to the group 274, are pixel data 267.

Figure 1:
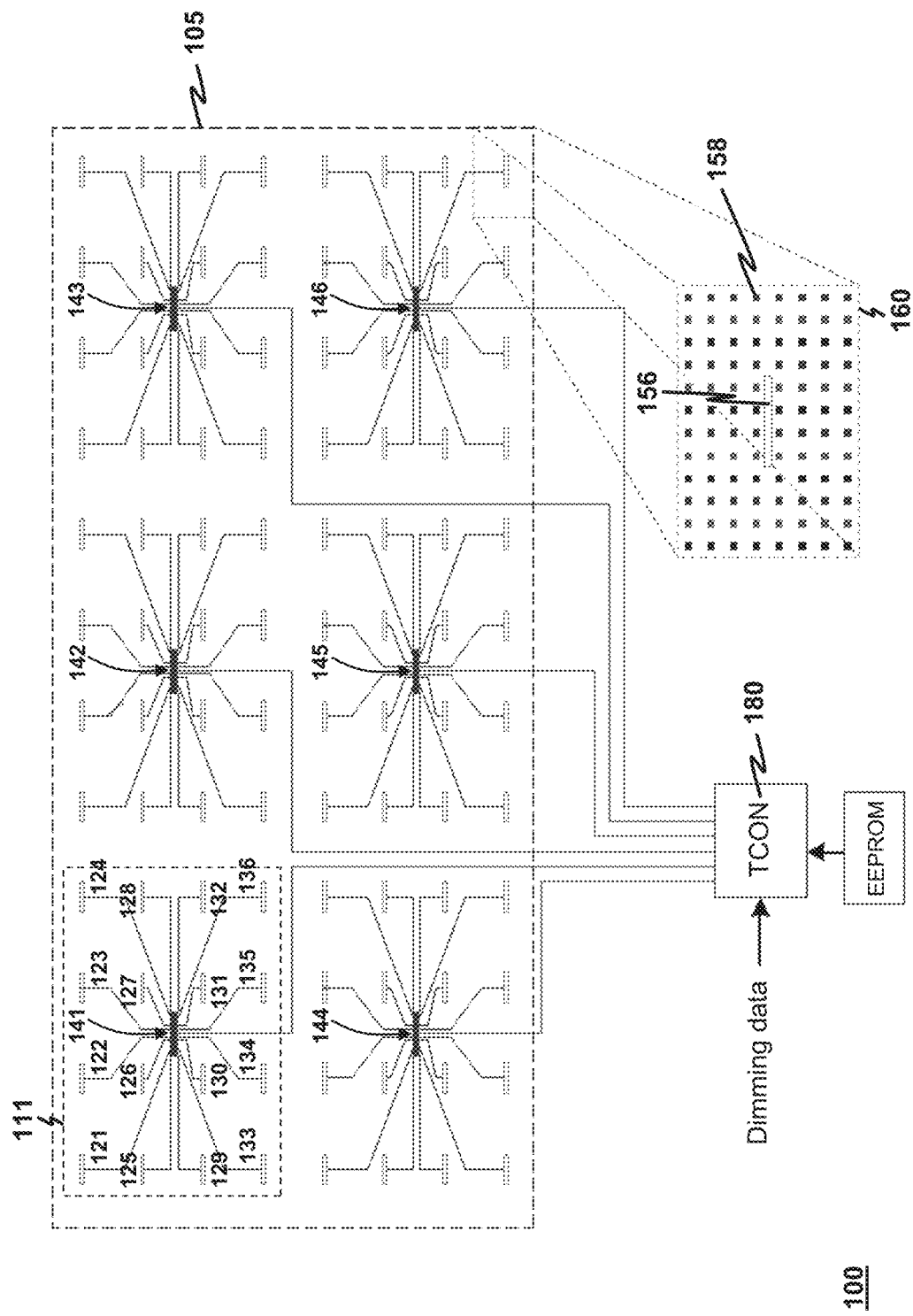
FIG. 1 depicts a conventional display panel using a star topology for networking a TCON, transceivers and various drivers.

In the display panel 200, particularly, the corresponding transceiver and the first drivers are daisy-chained and interconnected via a first number of one or more data lines to form a first linear daisy chain. By "being interconnected via the first number of one or more data lines", it is meant that, among the corresponding transceiver and the first drivers, two adjacent devices in the first linear daisy chain are connected with an individual set of one or more data lines, the number of the aforesaid one or more data lines being the first number. Advantageously, the first drivers are daisy-chained by connecting each pair of immediately-adjacent first drivers. It enables transmission of the corresponding pixel data from the corresponding transceiver to the first drivers while reducing a data-line footprint on the substrate in comparison to the case of using the first star-topology arrangement, as depicted in FIG. 1, to individually connect the corresponding transceiver to each of the first drivers.

For illustration, consider the group 273 again. The drivers 222a-d and the transceiver 212 are interconnected with links 251-254 to form a first linear daisy chain 250. Since the drivers 222a-d are sequentially located, the drivers 222a and 222b form a first pair of immediately-adjacent drivers and are connected by the link 252. Similarly, the drivers 222b and 222c form a second pair of immediately-adjacent drivers and are connected by the link 253. In addition, the drivers 222c and 222d form a third pair of immediately-adjacent drivers and are connected by the link 254. Clearly, if the transceiver 212 be required to independently connect to each of the drivers 222a-d, a total length of data lines required would be increased. It demonstrates the advantage of using the first linear daisy chain 250 instead of a star-topology arrangement in reducing the data-line footprint. Note that each of the links 251-254 is realized with the first number of one or more data lines. This point will be further elaborated later.

Turn to the group 274 also for illustration. The drivers 232a-d and the transceiver 212 are interconnected with links 261-264 to form another first linear daisy chain 260. Since the drivers 232a-d are sequentially located, the drivers 232a and 232b form one pair of immediately-adjacent drivers and are connected by the link 262, and so on for other pairs of immediately-adjacent drivers in the group 274. Similarly, if the transceiver 212 be required to independently connect to each of the drivers 232a-d, a total length of data lines required would be increased, demonstrating the advantage of using the first linear daisy chain 260 instead of the star-topology arrangement in reducing the data-line footprint.

In the display panel 200, the transceivers 211-214 are daisy-chained and interconnected via a second number of one or more data lines to form a second linear daisy chain 240. By "being interconnected via the second number of one or more data lines", it is meant that two adjacent transceivers amongst the transceivers 211-214 in the second linear daisy chain are connected with an individual set of one or more data lines, the number of the aforesaid one or more data lines being the second number. Advantageously, the transceivers 211-214 are daisy-chained by connecting each pair of immediately-adjacent transceivers. Thereby, it enables transmission of the pixel data 207 from the TCON 205 to the transceivers 211-214 while further reducing the data-line footprint on the substrate 290 in comparison to the case of using the second star-topology arrangement, as depicted in FIG. 1, to individually connect the TCON 205 to each of the transceivers 211-214. An explanation of forming this advantage by using the second linear daisy chain 240 is similar to the explanation made above regarding the data-line footprint reduction due to the first linear daisy chain 250 or 260. Note that each of links 241-243 is realized with the second number of one or more data lines. This point will be further elaborated later.

Optionally, the second linear daisy chain 240 is expanded by further daisy-chaining the TCON 205 and the transceiver 211. That is, the TCON 205 and the transceivers 211-214 are daisy-chained to form the second linear daisy chain 240.

Note that daisy-chaining the corresponding transceiver and the first drivers for each of the groups 271-278 results in eight first linear daisy chains, including the two abovementioned first linear daisy chains 250, 260. A combination of the second linear daisy chain 240 and the eight first linear daisy chains results in a fishbone topology network. The fishbone topology network is used to distribute the pixel data 207 from the TCON 205 to the drivers 221a-d, 222a-d, 223a-d, 224a-d, 231a-d, 232a-d, 233a-d, 234a-d.

One may broadcast the pixel data 207 from the TCON 205 unselectively to all the drivers 221a-d, 222a-d, 223a-d, 224a-d, 231a-d, 232a-d, 233a-d, 234a-d over the fishbone topology network. As such, the transceiver 212 copies the stream of original pixel data 207 (also regarded as the original pixel-data stream 207) to the two first linear daisy chains 250, 260 to form respective streams of pixel data 257, 267, respectively. It follows that data rates of the two respective pixel-data streams 257, 267 are the same as the data rate of the original pixel-data stream 207. The data rate of the original pixel-data stream 207 is often very high.

Alternatively, it is preferable and advantageous that for each of the groups 271-278 in the display panel 200, the corresponding transceiver is configured to extract the corresponding pixel data from the pixel data 207 received from the second linear daisy chain 240 and then deliver the corresponding pixel data to the first drivers through a respective first linear daisy chain. It causes the first number of one or more data lines to be operated at a first data rate less than a second data rate that the second number of one or more data lines are operated at. The key advantage that is achieved is that it enables more reliable transmission of the pixel data 207 to the drivers 221a-d, 222a-d, 223a-d, 224a-d, 231a-d, 232a-d, 233a-d, 234a-d in comparison to broadcasting the pixel data from the TCON 205 unselectively to all the drivers 221a-d, 222a-d, 223a-d, 224a-d, 231a-d, 232a-d, 233a-d, 234a-d. In practice, this higher-reliability advantage may be transformed into a reduced cost in manufacturing the display panel 200. For illustration of the higher-reliability advantage, consider the group 273, which has the drivers 222a-d. The pixel-data stream 257 addressed to the drivers 222a-d only has the first data rate. The original pixel-data stream 207 addressed to all the drivers 221a-d, 222a-d, 223a-d, 224a-d, 231a-d, 232a-d, 233a-d, 234a-d has the second data rate. Clearly, the first data rate is less than the second data rate due to supporting a smaller number of drivers, resulting in the advantage of more reliable transmission over the links 251-254.

One advantage of reducing the data-line footprint is that more substrate surface can be allocated for mounting the pixels, the drivers 221a-d, 222a-d, 223a-d, 224a-d, 231a-d, 232a-d, 233a-d, 234a-d and the transceivers 211-214. In the art, an individual LED in the pixels may be a micro LED having a small size such that an entirety of micro LEDs on the substrate 290 occupies only a small foot-print on the substrate area, typically 1-2% of the active display area. By using micro LEDs and by reducing the data-line footprint, the pixels, the drivers 221a-d, 222a-d, 223a-d, 224a-d, 231a-d, 232a-d, 233a-d, 234a-d and the transceivers 211-214 may be mounted on a same side of the substrate in the display panel 200, potentially reducing the manufacturing cost of the display panel 200.

It is advantageous if the data-line footprint can be reduced as much as possible or even minimized. The first and second numbers of one or more data lines may be minimized under a given practical situation so as to minimize the data-line footprint.

Preferably, the first number is selected to be one so as to minimize the data-line footprint among different choices of the first number. As a result, the corresponding transceiver and the first drivers in the individual group are daisy-chained and interconnected via a single data line used for serially transmitting the corresponding pixel data.

It is also possible to use one data line as the second number of one or more data lines for further minimizing the data-line footprint. However, the second data rate operated by the second number of one or more data lines is often substantially higher than the first data rate operated by the first number of one or more data lines. For example, in one prototype display panel, the second data rate is 100M bits per second while the first data rate is only 0.8M bits per second. Practically, differential signaling may be employed to transmit the pixel data 207 at a high data rate over the second number of one or more data lines. In certain embodiments, the second number is selected to be two such that the transceivers 211-214 are daisy-chained and interconnected via a pair of data lines. Furthermore, the transceivers 211-214 are configured to decode the pixel data 207 that are serially transmitted with differential signaling over the aforesaid pair of data lines. Since the pixel data 207 are generated by the TCON 205, the TCON 205 is also configured to encode the pixel data 207 for serial transmission with differential signaling before transmission over the link 208.

Figure 3:
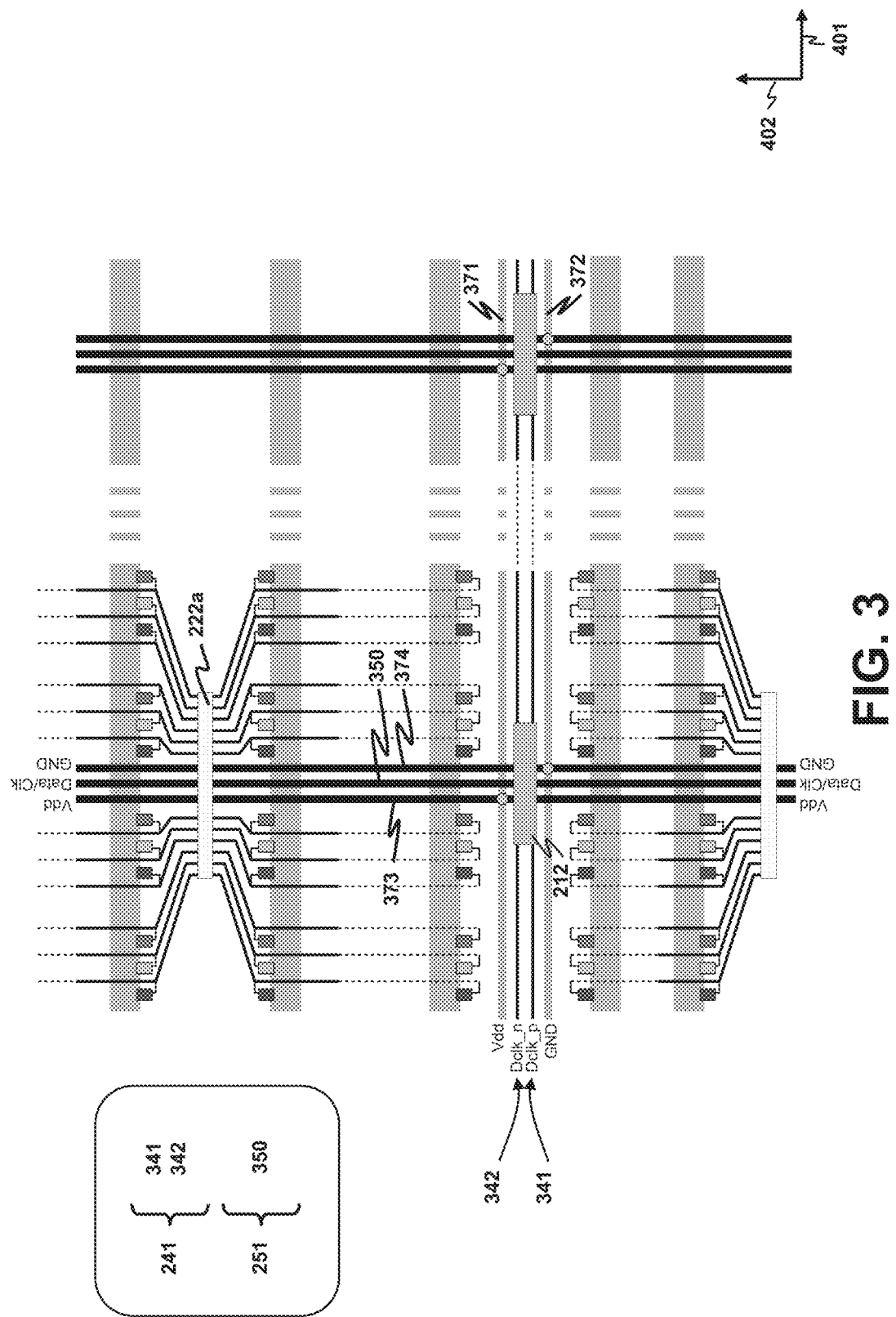
FIG. 3 depicts a part of the display panel of FIG. 2, where a pair of data lines are used to serially transmit pixel data with differential signaling from a TCON to a transceiver, and a single data line is used to serially transmit the pixel data from the transceiver to a driver.

For illustrating the aforementioned arrangement on the first and second numbers of one or more data lines, FIG. 3 depicts a part of the display panel 200 realized with such arrangement. The transceiver 212 receives the pixel data 207 through the link 241 realized with the second number of one or more data lines. In particular, the link 241 is composed of two data lines, which are Dclk_p 341 and Dclk_n 342. Dclk_p 341 and Dclk_n 342 are differentially signaled such that if Dclk_p 341 carries a signal waveform s(t) with respect to GND (a ground voltage), Dclk_n 342 carries a complementary signal waveform −s(t) with respect to GND. The pixel data 207, which are serially encoded and differentially signaled, are received and decoded by the transceiver 212. The corresponding pixel data 257 addressing the drivers 222a-d are extracted from the pixel data 207. The corresponding pixel data 257 are then forwarded from the transceiver 212 to the driver 222a via the link 251 realized with the first number of one or more data lines. Only a single data line 350 is used as the link 251. The corresponding pixel data 257 are serially transmitted over the link 251 and received by the driver 222a.

In FIG. 3, it is shown that the two differentially signaled data lines, namely, Dclk_p 341 and Dclk_n 342, are surrounded by a first GND line 372 and a first voltage-supply (VDD) line 371, respectively, for ground shielding so as to reduce EMI and noise from entering into Dclk_p 341 and Dclk_n 342. The first voltage-supply line 371 and the first GND line 372 are also used to power the transceiver 212. Furthermore, Dclk_p 341 and Dclk_n 342 are realized as straight lines for reducing stray capacitance that may undesirably capture EMI. Similarly, the single data line 350 is realized as a straight line for stray-capacitance reduction and is surrounded by a second voltage-supply line 373 and a second GND line 374 for ground shielding. The second voltage-supply line 373 and the second GND line 374 are connected to the driver 222a for providing power thereto. The second voltage-supply line 373 and the second GND line 374 are connected to the first voltage-supply line 371 and the first GND line 372, respectively.

Note that a separate clock signal is not available to the transceiver 212 and the driver 222a. The absence of clock-signal lines further increases the substrate surface area available for accommodating the pixels, transceivers and drivers. In the absence of the clock signal, the transceiver 212 and the driver 222a are required to re-generate the clock signal from the serially-transmitted pixel data.

RLL coding is a coding technique used to send arbitrary data over a communication channel. Specifically, a RLL code bounds the length of runs of repeated bits during which the signal does not change. Excessively long runs of repeated bits make clock recovery difficult while high-frequency components in overly short runs can be attenuated in a bandlimited communication channel. The RLL code may be used by the TCON 205 to encode the pixel data 207 for enabling the pixel data 207 (including the corresponding pixel data 257 that address the first drivers 222a-d in the group 273) to be serially transmitted over the aforesaid two differentially signaled data lines 341, 342 and the single data line 350 as well as enabling clock recovery at the transceiver 212 and the driver 222a.

Clock recovery is achieved by using a PLL. In certain embodiments, each of the transceivers 211-214 and the drivers 221a-d, 222a-d, 223a-d, 224a-d, 231a-d, 232a-d, 233a-d, 234a-d is realized with a PLL for clock recovery. Since the number of drivers in a display panel is usually much higher than the number of transceivers, the cost of the display panel may be reduced if the drivers are not implemented with PLLs. Instead of requiring the drivers to recover a clock signal from received pixel data, in certain embodiments a separate clock signal line is used to distribute a clock signal from the corresponding transceiver to the first drivers in the individual group.

As one practical choice, the RLL code that is used may be a 4b5b code. Details of the 4b5b code can be found in the art, e.g., in *Recommendation ITU-R BS.1873: Serial multi-channel audio digital interface for broadcasting studios*, published by ITU (International Telecommunication Union), 2010.

For reducing the manufacturing cost, it is not preferable that the substrate 290 is realized by a multi-layer PCB. It is desirable and preferable that some arrangement on the pixels, the drivers, the transceivers, various data lines, source lines and scan lines can be utilized to facilitate that all the data lines, source lines and scan lines can be accommodated on one side of the substrate 290. The current technology allows overlaying one layer of circuit wiring on top of another layer with insulator in-between any crossover points. With the arrangement of the present invention, there is no need to drill holes on the substrate 290 for manufacturing cost reduction. Such preferable arrangement is also depicted in FIG. 3. For clarity in presentation, FIG. 3 is reproduced as FIG. 4 with some changes in reference numerals and some additional numerals. The preferable arrangement is illustrated hereinafter with the aid of FIG. 4.

Figure 4:
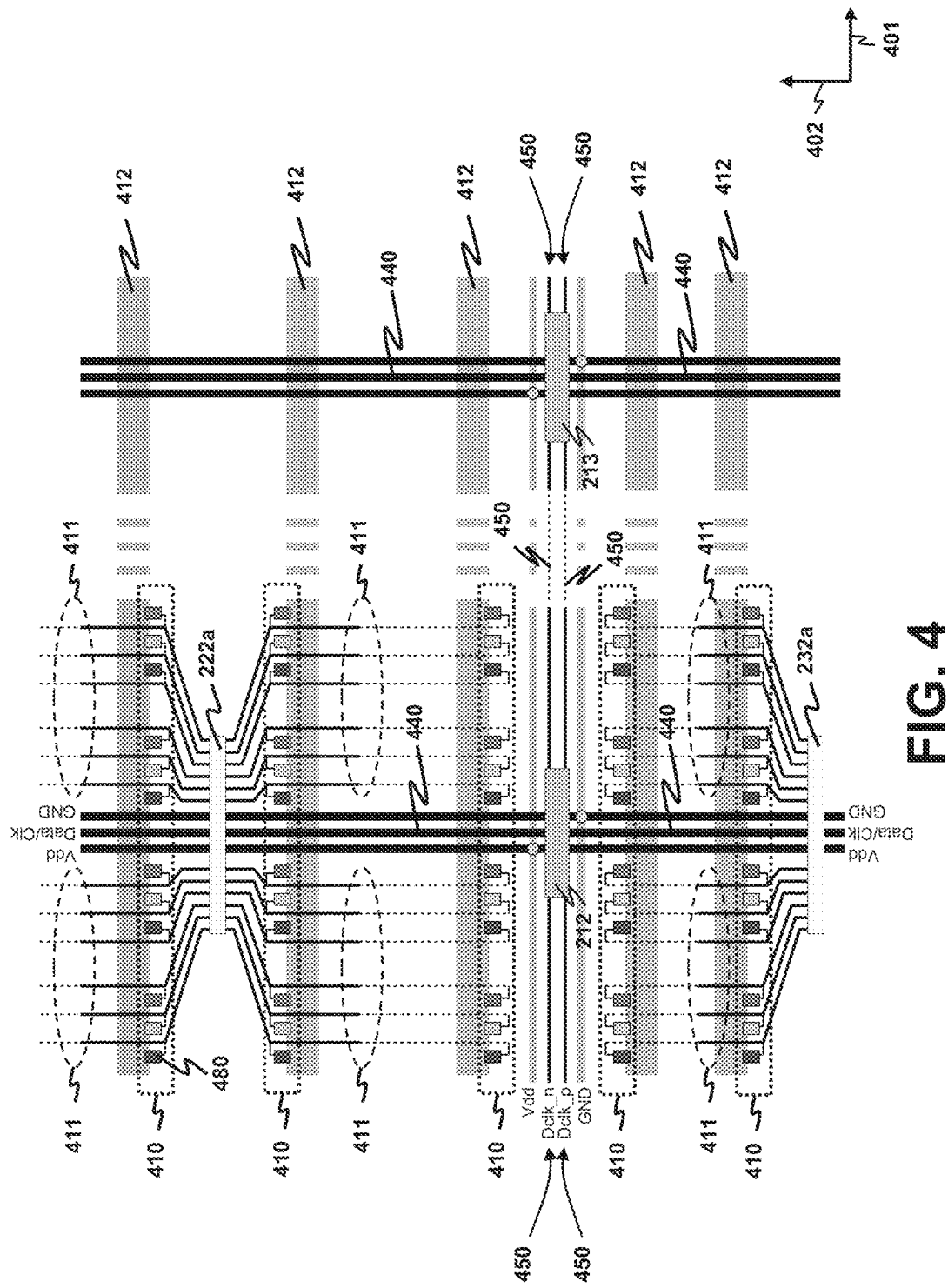
FIG. 4 is redrawn from FIG. 3 for charity of presentation, with some changes in reference numerals and some additional numerals.

Refer to FIG. 4. The pixels of the display panel 200 are referenced with numerical 410. As mentioned above, each of the pixels 410 includes a plurality of LEDs, e.g., a LED 480. The display panel 200 further comprises a plurality of source lines 411 and a plurality of scan lines 412. The plurality of source lines 411 is used for supplying driving currents from the drivers 221a-d, 222a-d, 223a-d, 224a-d, 231a-d, 232a-d, 233a-d, 234a-d to the pixels 410. The plurality of scan lines 412 is used for collecting the driving currents from the pixels 410 so that the driving currents return to GND. The plurality of source lines 411 and the plurality of scan lines 412 form a pixel-driving network for driving the pixels 410 by the drivers 221a-d, 222a-d, 223a-d, 224a-d, 231a-d, 232a-d, 233a-d, 234a-d. The display panel 200 additionally comprises a first plurality of data lines 440 and a second plurality of data lines 450. The first plurality of data lines 440 is used for interlinking the drivers 221a-d, 222a-d, 223a-d, 224a-d, 231a-d, 232a-d, 233a-d, 234a-d and connecting the drivers 221a-d, 222a-d, 223a-d, 224a-d, 231a-d, 232a-d, 233a-d, 234a-d to the transceivers 211-214. Note that the first plurality of data lines 440 includes data lines in the links 251-254, 261-264 (shown in FIG. 2). The second plurality of data lines 450 is used for interlinking the transceivers 211-214, and is composed of data lines in the links 241-243 (shown in FIG. 2). The first and second pluralities of data lines 440, 450 form a pixel-data distribution network for delivering the pixel data 207 to the drivers 221a-d, 222a-d, 223a-d, 224a-d, 231a-d, 232a-d, 233a-d, 234a-d.

The pixels 410 are arrayed along a first reference direction 401 and a second reference direction 402, where the first and second reference directions 401, 402 are perpendicular to each other. However, it is understood that although the pixels 410 are aligned along the two perpendicular reference directions 401, 402, it does not mean that an entirety of pixels necessarily results in a rectangular display area of the display panel 200. The plurality of source lines 411 runs generally along the second reference direction 402 while the plurality of scan lines 412 runs generally along the first reference direction 401.

The drivers 221a-d, 222a-d, 223a-d, 224a-d, 231a-d, 232a-d, 233a-d, 234a-d are arrayed along the first and second reference directions 401, 402. The first drivers in the individual group and the corresponding transceiver are substantially-linearly distributed on the substrate 290 along the second reference direction 402. For instance, the transceiver 212 and the drivers 222a-d are positioned on the substrate 290 to be substantially-linearly distributed along the second reference direction 402. Hence, it is possible to configure the first number of data lines (e.g., the data line 350 linking the transceiver 212 and the driver 222a as shown in FIG. 3) to run generally along the second reference direction 402. Thereby, it configures the first plurality of data lines 440 to run generally along the second reference direction 402. Since the first plurality of data lines 440 and the plurality of source lines 411 run generally along the same direction, it facilitates the first plurality of data lines 440 and the plurality of source lines 411 to be compactly realized on a first layer of the substrate 290.

The transceivers 211-214 are substantially-linearly distributed on the substrate 290 along the first reference direction 401. As a result, it is possible to configure the second number of data lines (e.g., the data lines 341, 342 as shown in FIG. 3) to run generally along the first reference direction 401. Hence, it configures the second plurality of data lines 450 to run generally along the first reference direction 401. Since the second plurality of data lines 450 and the plurality of scan lines 412 run generally along the same direction, it facilitates the second plurality of data lines 450 and the plurality of scan lines 412 to be compactly realized on a second layer of the substrate 290.

Refer to FIG. 2. Although the fishbone topology network has a lower data-line footprint than a star-topology network, the star-topology network has an advantage that all connections are one-to-one mappings so that it is not necessary to assign ID numbers or addresses to transceivers and drivers in the star-topology network. On the other hand, ID numbers are required to be assigned to the transceivers 211-214 and the drivers 221a-d, 222a-d, 223a-d, 224a-d, 231a-d, 232a-d, 233a-d, 234a-d in the display panel 200. Although respective ID numbers can be pre-embedded into these transceivers and drivers during IC fabrication, it is a costly solution, let alone the risk of incorrectly positioning any of these transceivers and drivers on the substrate 290 during assembling.

It is desirable and preferable that the display panel 200 is implemented with an automatic ID number assignment mechanism that is activated at initialization of the display panel 200. The mechanism is realized with the TCON 205, apart from generating the pixel data 207, also configured to assign an individual ID number to each one of the transceivers 211-214 and the drivers 221a-d, 222a-d, 223a-d, 224a-d, 231a-d, 232a-d, 233a-d, 234a-d at initialization of the display panel 200. The ID number is used by the TCON 205 as an address in delivering the pixel data 207. The transceivers 211-214 and the drivers 221a-d, 222a-d, 223a-d, 224a-d, 231a-d, 232a-d, 233a-d, 234a-d are also additionally configured to realize the automatic ID number assignment mechanism as follows.

Figure 5:
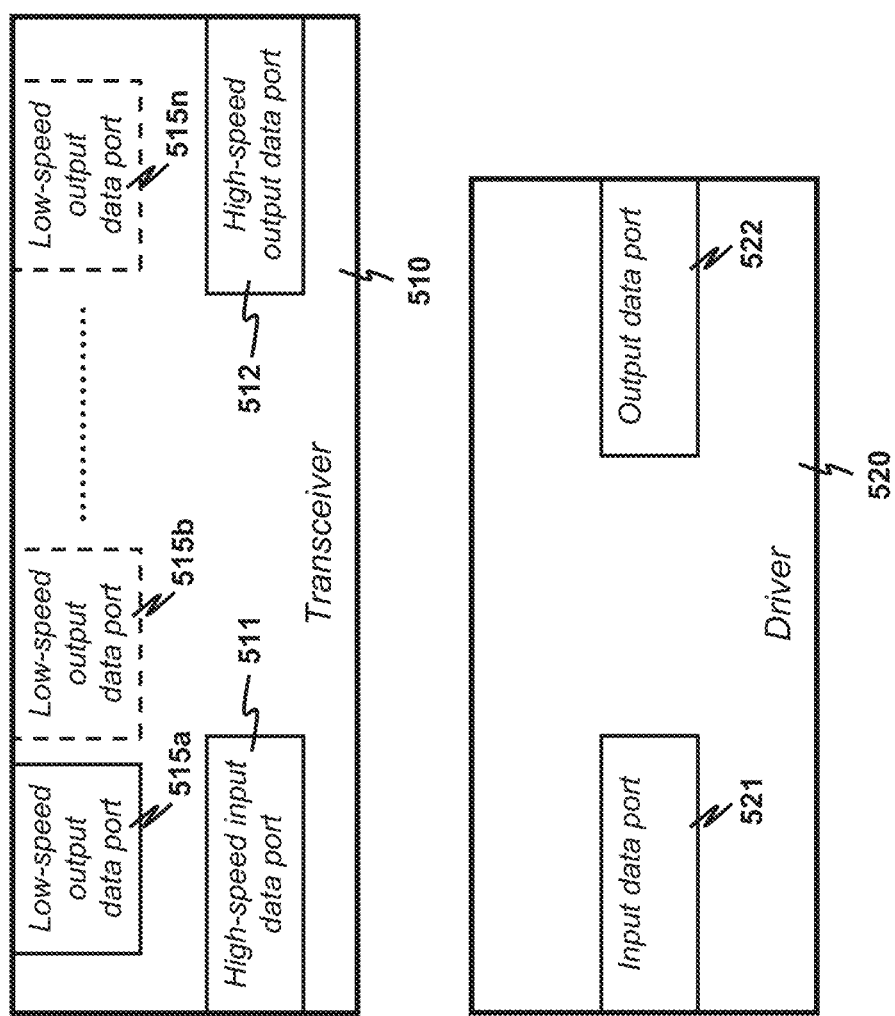
FIG. 5 depicts an exemplary transceiver and an exemplary driver both configured to enable automatic ID number assignment over the transceivers and drivers in the fishbone topology network.

FIG. 5 depicts a transceiver 510 and a driver 520 as exemplary models for realizing the transceivers 211-214 and the drivers 221a-d, 222a-d, 223a-d, 224a-d, 231a-d, 232a-d, 233a-d, 234a-d. Both the transceiver 510 and the driver 520 are configured to enable automatic ID number assignment.

The transceiver 510 comprises a high-speed input data port 511, a high-speed output data port 512 and a third number of one or more low-speed output data ports 515a-n. The third number is at least one. The high-speed input data port 511 and the high-speed output data port 512 are used in daisy-chaining with adjacent transceivers. When the transceiver 510 is used as the corresponding transceiver in the individual group, one low-speed output data port (selected from the third number of one or more low-speed output data ports 515a-n) is used in daisy-chaining the corresponding transceiver and the first drivers. Specifically, the high-speed input data port 511 of the transceiver 510 is used for connecting to a respective high-speed output data port of a previous transceiver in the second linear daisy chain 240, or to the TCON 205, so as to receive any data, including the pixel data 207, from the previous transceiver or from the TCON 205. The high-speed output data port 512 is used for connecting to a respective high-speed input data port of a subsequent transceiver next to the transceiver 510 in the second linear daisy chain 240 so as to forward the data, including the pixel data 207, to the subsequent transceiver.

Furthermore, the transceiver 510 is configured as follows. At the initialization of the display panel 200, the high-speed output data port 512 is disconnected from the high-speed input data port 511. The two high-speed data ports 511, 512 are disconnected at least before any ID number is received at the high-speed input data port 511. The transceiver 510 adopts any ID number that is first received by the high-speed input data port 511 as the ID number assigned to the transceiver 510 by the TCON 205. After the transceiver 510 receives the assigned ID number, the high-speed input data port 511 and the high-speed output data port 512 are connected. It allows subsequent ID numbers generated from the TCON 205 to pass to remaining transceivers for ID number assignment.

The driver 520 comprises an input data port 521 and an output data port 522. When the driver 520 is used as one of the first drivers in the individual group, the input data port 521 and the output data port 522 are used in daisy-chaining the corresponding transceiver and the first drivers. Consider the group 273 as an example for illustration. The input data port 521 of the driver 520 is used for connecting to a respective output data port of a previous driver in the first linear daisy chain 250, or to the transceiver 212, so as to receive any data, including the corresponding pixel data 257, from the previous driver or from the transceiver 212. The output data port 522 is used for connecting to a respective input data port of a subsequent driver next to the driver 520 in the first linear daisy chain 250 so as to forward the data, including the corresponding pixel data 257, to the subsequent driver.

In addition, the driver 520 is configured as follows. At the initialization of the display panel 200, the output data port 522 is disconnected from the input data port 521. The two data ports 521, 522 are disconnected at least before any ID number is received at the input data port 521. The driver 520 adopts any ID number that is first received by the input data port 521 as the ID number assigned to the driver 520 by the TCON 205. After the driver 520 receives the assigned ID number, the input data port 521 and the output data port 522 are connected. It allows subsequent ID numbers generated from the TCON 205 to pass to remaining drivers in the individual group for ID number assignment.

As mentioned above, the third number is at least one. In certain embodiments, the third number is two such that the transceiver 510 is usable for directly relaying the pixel data 207 to two different groups. This configuration of the transceiver 510 can be used to realize each of the transceivers 211-214 as shown in FIG. 2.

Practically, the transceiver 510 and the driver 520 may be further configured as follows. Each of the transceiver 510 and the driver 520 resets itself when no clock signal is detected from its respective input, so that a RESET pin is not required. In IC realization, each of the transceiver 510 and the driver 520 includes neither ID pins for receiving its assigned ID number, nor a SYNC pin for synchronizing operations among different transceivers and drivers. In the absence of the SYNC pin, the TCON 205 broadcasts commands to synchronize the operations among all the transceivers and drivers.

Figure 6:
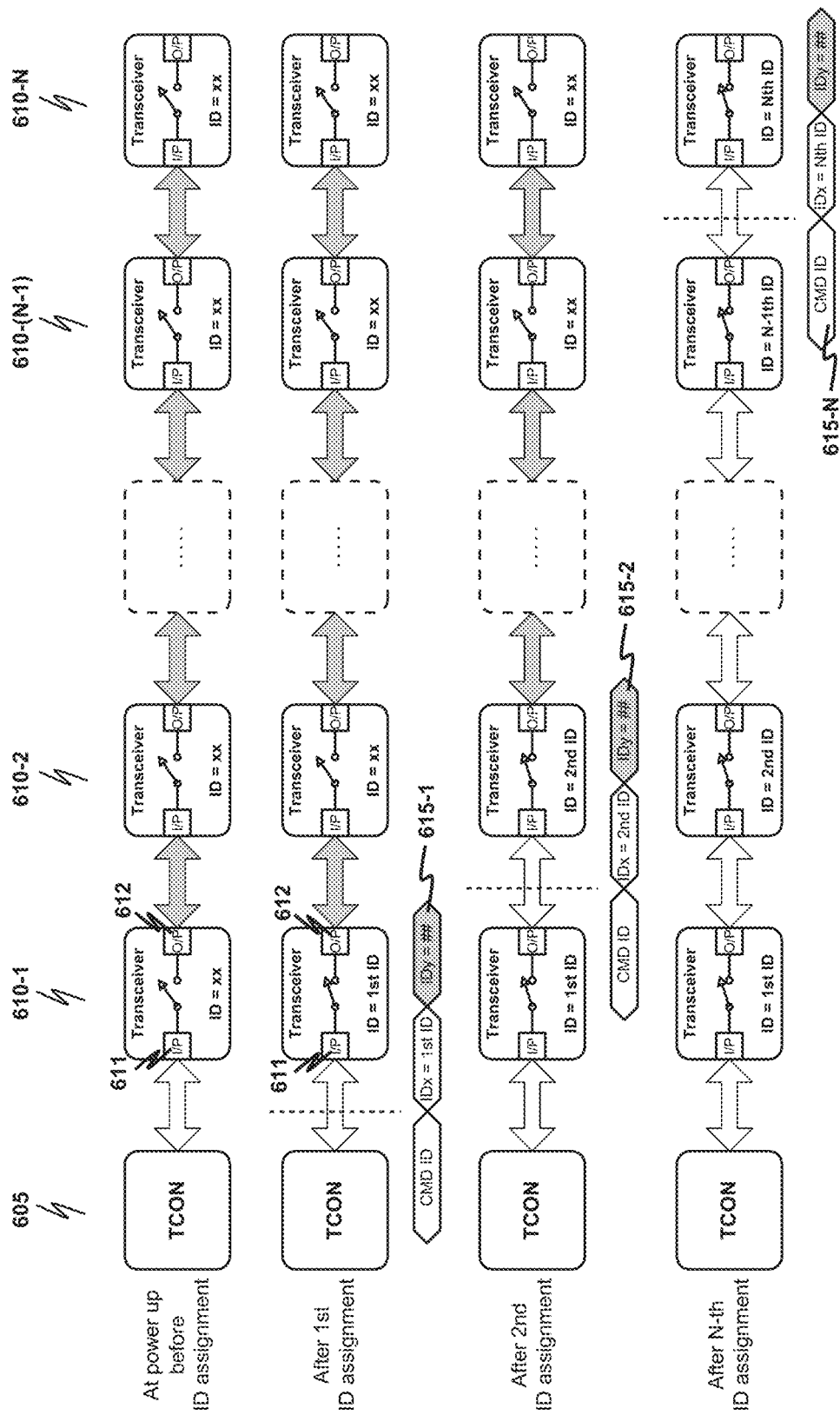
FIG. 6 illustrates a first stage of an automatic ID number assignment process, where the first stage is used to assign ID numbers to the transceivers.
Figure 7:
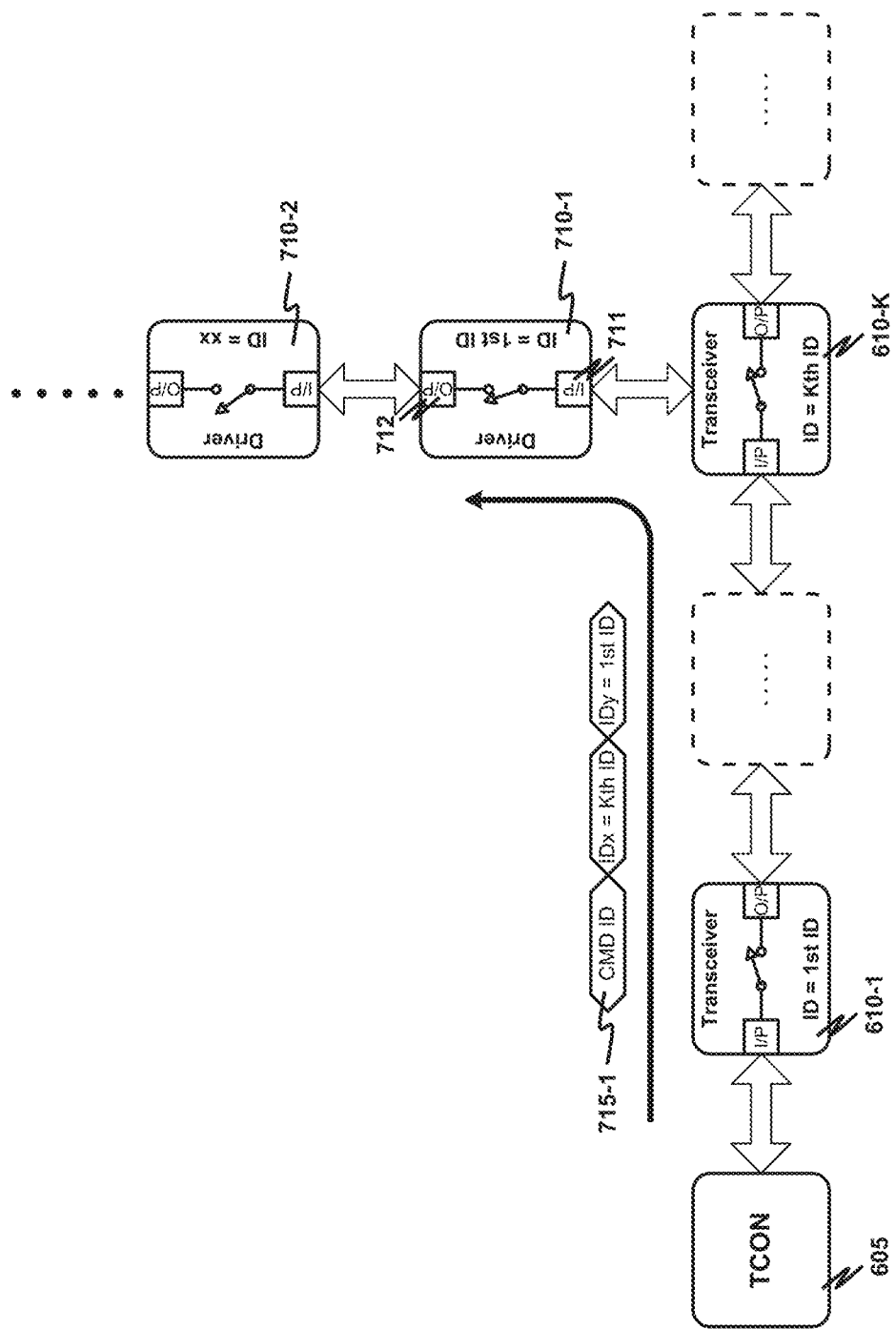
FIG. 7 illustrates a second stage of the automatic ID number assignment process, where the second stage is used to assign ID numbers to the drivers after the first stage is completed.

Based on using the transceiver 510 and the driver 520 as models for realizing the transceivers 211-214 and the drivers 221a-d, 222a-d, 223a-d, 224a-d, 231a-d, 232a-d, 233a-d, 234a-d in the display panel 200, an automatic ID number assignment process can be formulated by extending a method disclosed in US2016/0364354 for ID number assignment for a single directional data transmission to a fishbone topology network. FIGS. 6 and 7 illustrate first and second stages, respectively, of the disclosed assignment process in a general setting, where the first and second stages automatically assign ID numbers to transceivers 610-1:N and to drivers 710-1:2, respectively. A TCON 605 is used to initiate the process and generate ID numbers for assignment.

Refer to FIG. 6. At power up, i.e. at initialization, all the transceivers 610-1:N are in the RESET state, and the high-speed input data port (e.g. port 611 of the transceiver 610-1) and the high-speed output data port (e.g. port 612 of the transceiver 610-1) of an individual transceiver are disconnected. The TCON 605 then initiates the assignment process by issuing a first ID assignment command 615-1, which includes an ID number for the transceiver 610-1 (viz., the transceiver immediately connected to the TCON 605). The transceiver 610-1 adopts the ID number embedded in the command 615-1 as its own ID number, and then connects the two ports 611, 612. The TCON 605 then issues a second ID number assignment command 615-2. Since the two ports 611, 612 of the transceiver 610-1 are connected, the second ID number assignment command 615-2 is received by the next transceiver 610-2, such that the transceiver 610-2 acquires and adopts an ID number embedded in the command 615-2 as its ID number. The TCON 605 repeats the command-issuing step until the Nth ID number assignment command 615-N is issued, enabling the last transceiver 610-N to get its own ID number. The first stage is then completed, and then the second stage begins.

Refer to FIG. 7. FIG. 7 exemplarily illustrates the second stage by considering ID number assignment for the driver 710-1, where the driver 710-1 is immediately connected to the transceiver 610-K. ID assignment for respective drivers in each group of drivers is similar to ID assignment for the transceivers 610-1:N. The TCON 605 issues an ID assignment command 715-1 addressed to the Kth transceiver 610-K. Note that the command 715-1 includes both the ID number of the Kth transceiver 610-K (and hence known to the Kth transceiver 610-K) and a new ID number for a driver. The Kth transceiver 610-K receives the command 715-1 and diverts it to the driver 710-1. The driver 710-1 adopts the new ID number embedded in the command 715-1 as its own ID number, and then connects its input data port 711 and output data port 712 so as to propagate subsequent ID assignment commands to subsequent drivers. The TCON 605 repeats issuing ID assignment commands until all drivers are assigned with respective ID numbers. The second stage is then completed.

Other implementation details of the display panel 200 are provided as follows.

Refer to FIG. 2. The display panel 200 further comprises the TCON 205 and a solid-state memory 206. Most often the TCON 205 and the solid-state memory 206 are mounted on the substrate 290. The solid-state memory 206, which may be implemented as an EEPROM, is used for storing compensation data of different LEDs of the pixels. The compensation data are used in computing a driving-current level for driving an individual LED to achieve a desired luminance level. The TCON 205 is arranged to receive dimming data 204 for the pixels. The dimming data 204 specifies a luminance level of each primary color that an individual pixel is to produce in order to generate a desired image on the display panel 200. The TCON 205 is used for generating the pixel data 207 from the dimming data 204. The TCON 205 is configured to generate the pixel data 207 by scaling the dimming data 204 according to the compensation data.

Figure 8:
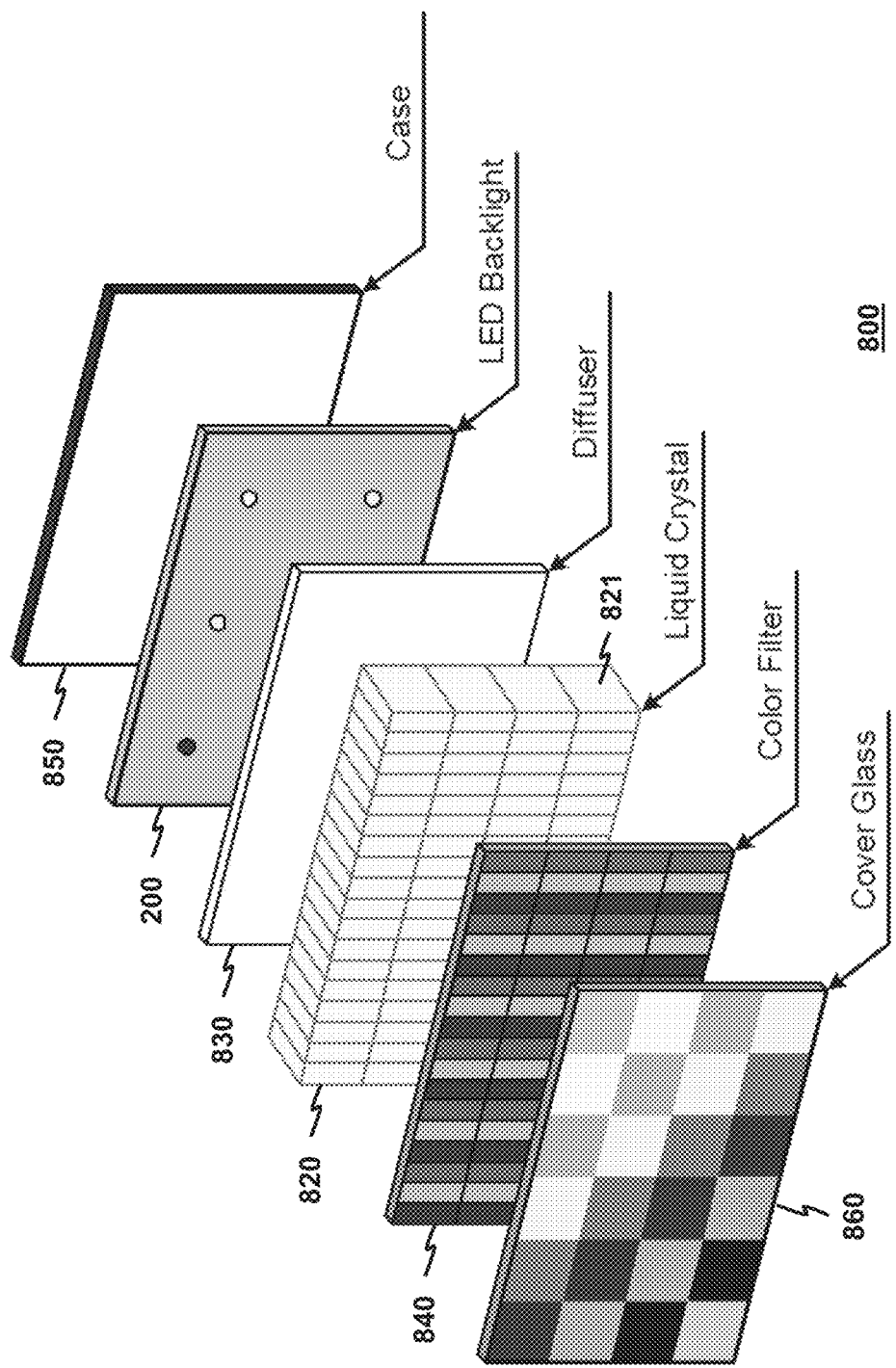
FIG. 8 depicts an optional arrangement of a LC display panel having the display panel of FIG. 2 functioned as a LED backlight for enhancing a dynamic range of light intensity in image generation by overlaying a LC cell on an individual pixel such that the LC cell modulates a light intensity level of a backlight beam generated by the individual pixel.
Figure 9:
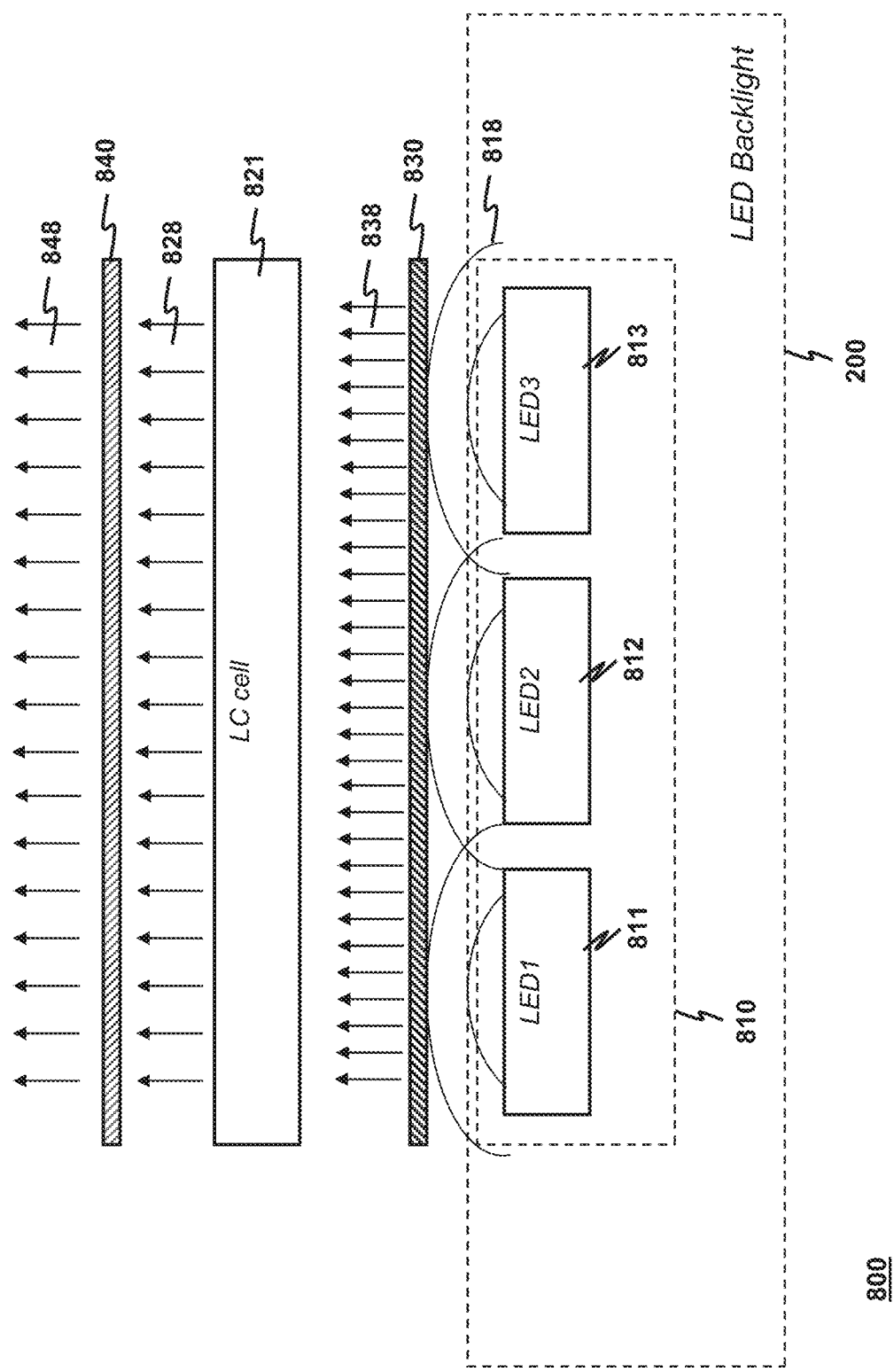
FIG. 9 depicts an alternative view of the LC display panel of FIG. 8 with the light beam transmitted.

Refer to FIG. 8, which depicts an optional arrangement of a LC display panel 800 having the display panel 200 functioned as a LED backlight for enhancing a dynamic range of light intensity in generating an image on the LC display panel 800. In this arrangement, the LC display panel 800 further comprises a LC layer 820 having plural LC cells 821, a diffuser 830, a color filter layer 840, a case 850, and a cover glass 860. As shown in FIG. 9, an individual LC cell 821 overlies a respective pixel 810 selected from the pixels of the display panel 200. The respective pixel 810 may include a plurality of LEDs 811-813 for color-light generation. The respective pixel 810 is used for generating a backlight beam 818, which has to be diffused before reaching to the LC layer 820. The backlight beam 818 without passing through the diffuser 830 is a condensed light spot. The backlight beam 818 is diffused by the diffuser 830 to form a diffused light 838. The individual LC cell 821 is used for controllably modulating a light intensity of the diffused light 838 from the diffuser 830 so as to output a polarized light beam 828 to the color filter layer 840. With the help of the color filter layer 840, a filtered-modulated light 848 is obtained and a color image is produced.

Figure 10:
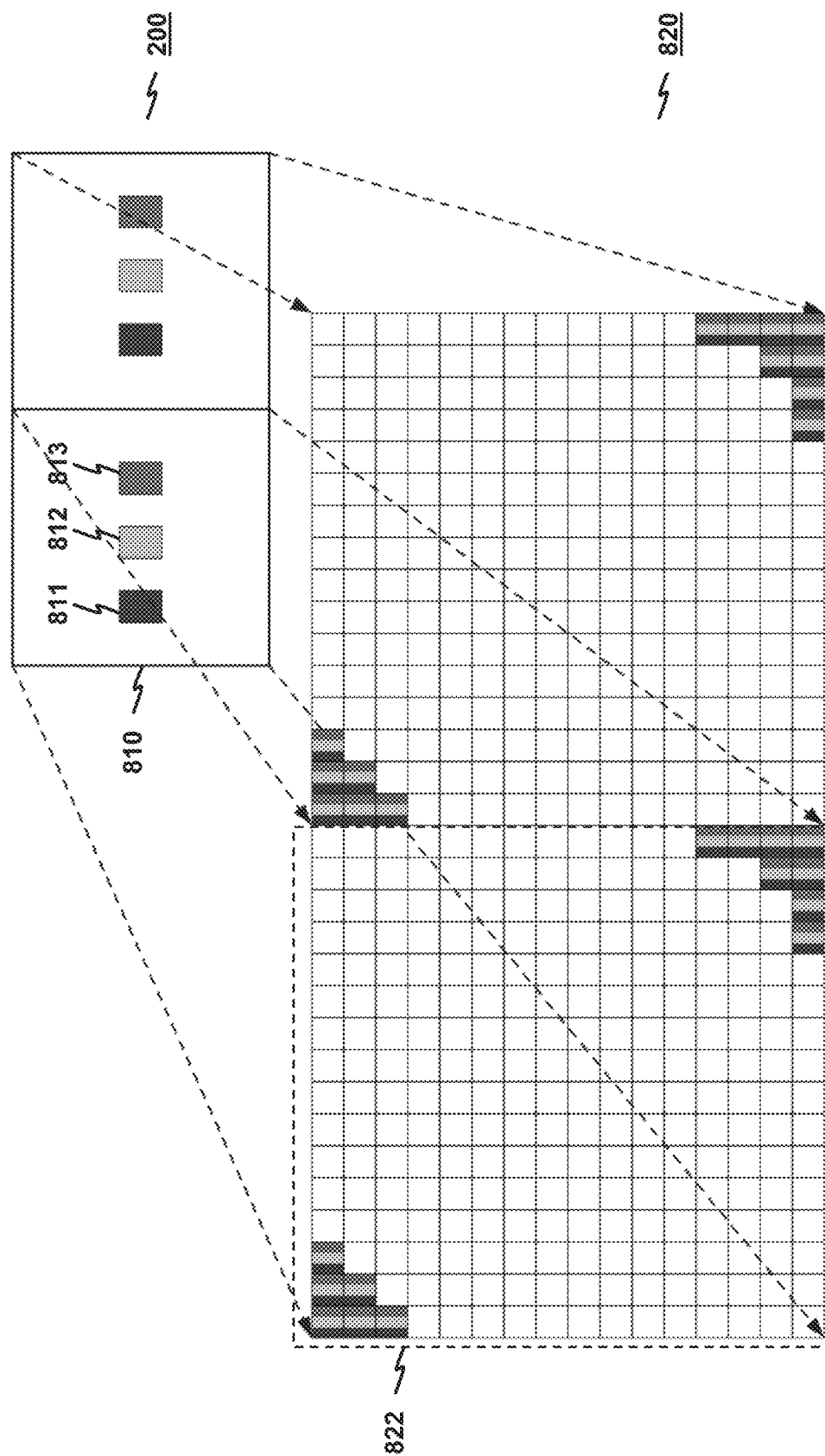
FIG. 10 depicts a part of the LC display panel of FIG. 8, showing two pixels of the LED backlight and the corresponding LC cells on the LC layer.
Figure 11:
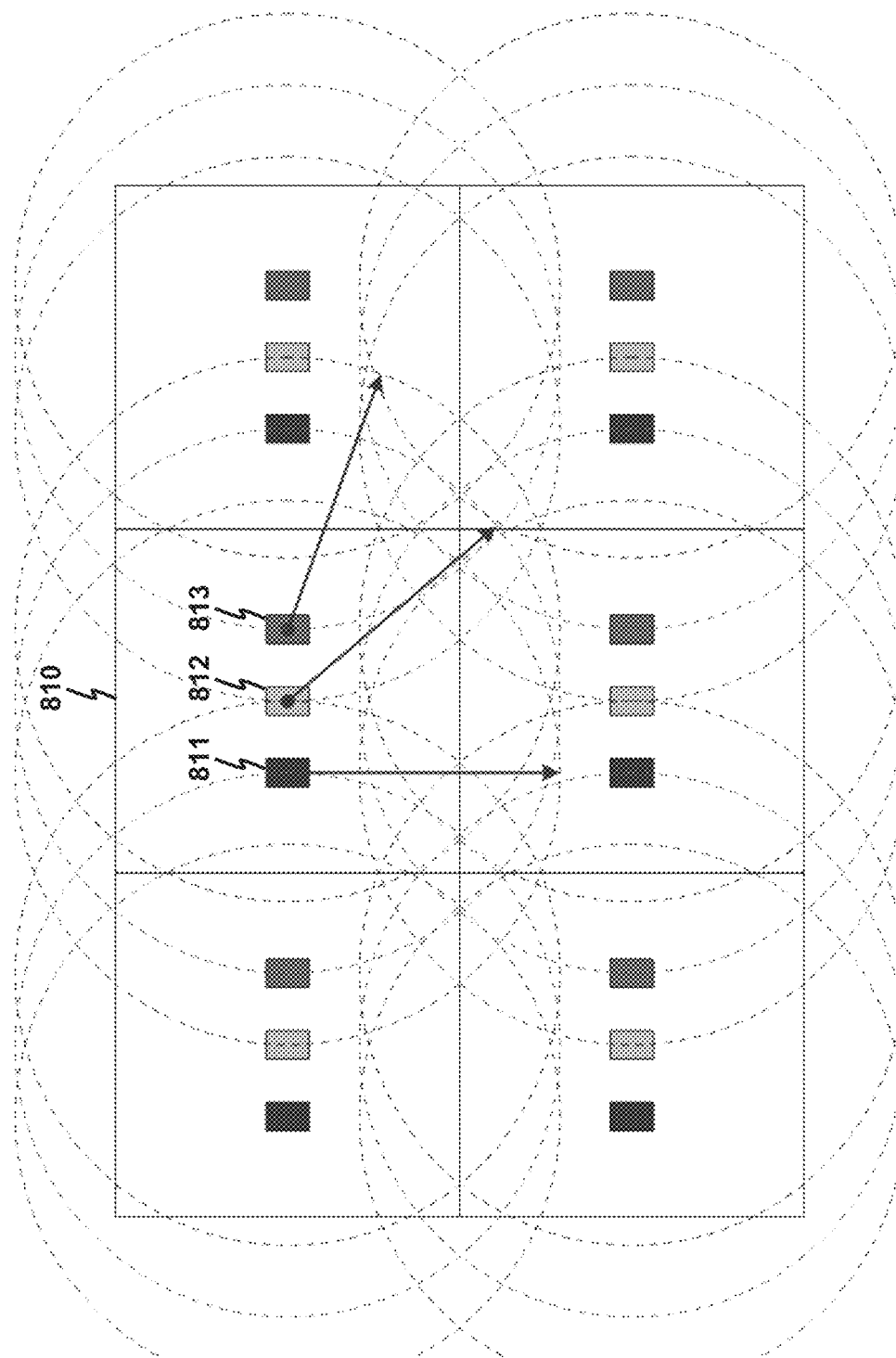
FIG. 11 depicts the diffusion of light from six pixels of the LED backlight in the LC display panel of FIG. 8.

In this optional arrangement of the LC display panel 800 having the display panel 200 functioned as a LED backlight, the number of LEDs in the display panel 200 is much less than the number of LC cells in the LC layer 820. For example, in a full high definition (FHD) LC display panel 800 with a resolution of 1920×1080, the LC cells on the LC layer 820 are grouped into a plurality of zones 822 each having 16×16 cells. Therefore, the LC layer 820 has 8100 zones 822 overlies 8100 pixels 810 on the display panel 200, as demonstrated in FIG. 10. Each pixel 810 on the display panel 200 includes a plurality of LEDs 811-813 for color-light generation and functions as a backlight for the respective zone 822. The color and brightness of the LEDs 811-813 for each zone 822 can advantageously be controlled independently. In certain embodiments, the LC cells in a zone may receive light from a plurality of pixels, including other neighboring pixels overlaid by other neighboring zones. As shown in FIG. 11, the diffusion of light from six pixels 810 of the display panel 200 is depicted. A smooth transition between the zones 822 can be achieved.

A conventional LC display is not a perfect light modulator. If a particular pixel is configured to generate pure red, then the LC for the red sub-pixel should be fully opened while the LC for the green sub-pixel and the blue sub-pixel should be fully closed. However, with the limitation of the current technology, the LC for the green sub-pixel and the blue sub-pixel cannot be fully closed. Light escape and leakage at the LC layer is inevitable. The red color generated is not a pure red and so the LC display cannot reproduce a vivid color. In contrast, an OLED display panel (without LC layer) does not have the problem of light escape. With the present invention, a particular primary color can be fully turned off at the display panel 200. Even if the LC layer for a particular sub-pixel cannot be fully closed, the present invention provides a LED backlight using the display panel 200 which can locally fully turn off any color in a coarse sense. Thereby, it increases the dynamic range of light intensity in generating the image with more vivid colors.

Figure 12:
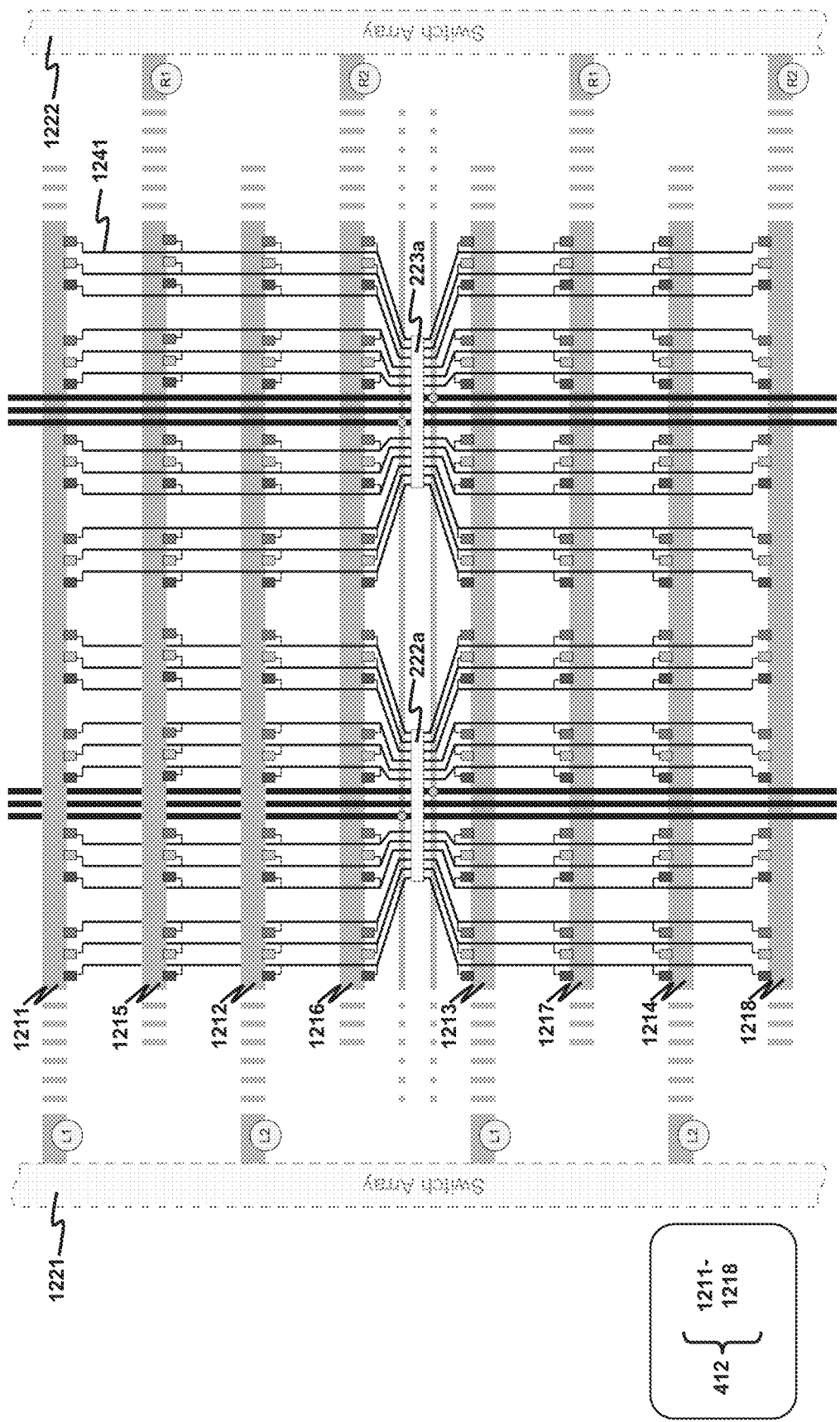
FIG. 12 depicts an optional arrangement of collecting driving currents from scan lines by using switch arrays.

Refer to FIG. 12, which depicts an optional arrangement of collecting the driving currents from the plurality of scan lines 412. The plurality of scan lines 412 includes individual scan lines 1211-1218. Although the individual scan lines 1211-1218 are used to collect the driving currents originated from the drivers 222a, 223a as an example shown in FIG. 12, the present invention is not limited only to collecting the driving currents for two adjacent drivers. Individual scan lines may collect driving currents originated from any number of drivers as deemed appropriate by those skilled in the art. The driving currents collected by the individual scan lines 1211-1218 are a left-side switch array 1221 and a right-side switch array 1222. In a non-limiting example shown in FIG. 12, the driving currents collected by the individual scan lines 1211-1214 are received by the left-side switch array 1221 while those driving currents collected by the individual scan lines 1215-1218 are received by the right-side switch array 1222. Each of the two switch arrays 1221, 1222 is configured to controllably select any individual scan line to switch on for receiving the collected driving current therefrom. By synchronizing the switching-on operation of a switch array and the driving action of a driver, LEDs in a row of a pixel array are selected and powered to illuminate with respective desired luminance levels. Synchronization of the two switch arrays 1221, 1222 and the concerned drivers 222a, 223a may be managed by the TCON 205. Also note that in practical implementations, a scan line (e.g., the scan line 1211) is usually thicker than a source line (e.g., source line 1241).

As a concluding remark, the major industrial advantages of the disclosed display panel are two-fold:

Manufacturing-cost reduction: The realization of mounting the transceivers, drivers and pixels (or LEDs) on the same side of a substrate and the feasibility of avoiding the use of a multi-layer PCB as the substrate both lead to a reduction in the manufacturing cost. The automatic assignment of ID numbers to the transceivers and drivers also helps lowering the manufacturing cost.

Scalability: The fishbone topology is flexible. It is easy to adopt or scale up/down the topology to any size and any shape of display area. Irregularly shaped displays (namely, non-rectangular displays) are supportable.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A display panel comprising:
    plural light-generating pixels;
    plural drivers collectively used for driving the pixels according to pixel data, the pixel data being arranged to be generated by a timing controller;
    plural transceivers collectively used for relaying the pixel data from the timing controller to the drivers, one of the transceivers being arranged to connect to the timing controller for receiving the pixel data; and
    a substrate on which the pixels, the drivers and the transceivers are mounted;
    wherein:
    the drivers are divided into plural groups of drivers, first drivers in an individual group being arranged to receive corresponding pixel data addressed thereto solely from a corresponding transceiver selected from the transceivers;
    the corresponding transceiver and the first drivers are daisy-chained and interconnected via a first number of one or more data lines to form a first linear daisy chain, the first drivers being daisy-chained by connecting each pair of immediately-adjacent first drivers to thereby enable transmission of the corresponding pixel data from the corresponding transceiver to the first drivers while reducing a data-line footprint on the substrate in comparison to a first star-topology arrangement of individually connecting the corresponding transceiver to each of the first drivers;
    the transceivers are daisy-chained and interconnected via a second number of one or more data lines to form a second linear daisy chain, the transceivers being daisy-chained by connecting each pair of immediately-adjacent transceivers to thereby enable transmission of the pixel data from the timing controller to the transceivers while further reducing the data-line footprint on the substrate in comparison to a second star-topology arrangement of individually connecting the timing controller to each of the transceivers; and
    the corresponding transceiver is configured to extract the corresponding pixel data from the pixel data received from the second linear daisy chain and then deliver the corresponding pixel data to the first drivers through the first linear daisy chain, causing the first number of one or more data lines to be operated at a first data rate less than a second data rate that the second number of one or more data lines are operated at, thereby enabling more reliable transmission of the pixel data to the drivers in comparison to broadcasting the pixel data from the timing controller unselectively to all the drivers.

2. The display panel of claim 1, wherein the drivers are divided into the groups such that the first drivers in the individual group are substantially-linearly distributed on the substrate.

3. The display panel of claim 1, wherein the pixels, the drivers and the transceivers are mounted on a same side of the substrate.

4. The display panel of claim 1, wherein the first number is one so as to minimize the data-line footprint among different choices of the first number.

5. The display panel of claim 4, wherein each of the first drivers is configured to decode the corresponding pixel data that are encoded by a run length limited (RLL) code.

6. The display panel of claim 1, wherein the second number is two such that the transceivers are daisy-chained and interconnected via a pair of data lines, and wherein the transceivers are configured to decode the pixel data that are serially transmitted with differential signaling over said pair of data lines.

7. The display panel of claim 6, wherein each of the transceivers is configured to decode the pixel data that are encoded by a run length limited (RLL) code.

8. The display panel of claim 1 further comprising:
    a plurality of source lines for supplying driving currents from the drivers to the pixels;
    a plurality of scan lines for collecting the driving currents from the pixels, the plurality of source lines and the plurality of scan lines forming a pixel-driving network for driving the pixels by the drivers;
    a first plurality of data lines for interlinking the drivers and connecting the drivers to the transceivers; and
    a second plurality of data lines for interlinking the transceivers, the first and second pluralities of data lines forming a pixel-data distribution network for delivering the pixel data to the drivers;
    wherein:
    the pixels are arrayed along a first reference direction and a second reference direction perpendicular thereto, the plurality of source lines running generally along the second reference direction, the plurality of scan lines running generally along the first reference direction;
    the drivers are arrayed along the first and second reference directions, the first drivers in the individual group and the corresponding transceiver being substantially-linearly distributed on the substrate along the second reference direction, the first number of data lines running generally along the second reference direction, thereby configuring the first plurality of data lines to run generally along the second reference direction so as to facilitate the first plurality of data lines and the plurality of source lines to be compactly realized on a first layer; and the transceivers are substantially-linearly distributed on the substrate along the first reference direction, the second number of data lines running generally along the first reference direction, thereby configuring the second plurality of data lines to run generally along the first reference direction so as to facilitate the second plurality of data lines and the plurality of scan lines to be compactly realized on a second layer.

9. The display panel of claim 8, wherein the pixels, the drivers and the transceivers are mounted on a same side of the substrate.

10. The display panel of claim 8, wherein:
the first number is one so as to minimize the data-line footprint among different choices of the first number;
the second number is two such that the transceivers are daisy-chained and interconnected via a pair of data lines; and
the transceivers are configured to decode the pixel data that are serially transmitted with differential signaling over said pair of data lines.

11. The display panel of claim 1 further comprising:
the timing controller for generating the pixel data and for assigning an identification (ID) number to each one of the transceivers and the drivers at initialization of the display panel, the ID number being used by the timing controller as an address in delivering the pixel data.

12. The display panel of claim 11, wherein:
an individual transceiver comprises a high-speed input data port, a high-speed output data port and a third number of one or more low-speed output data ports, wherein the high-speed input data port and the high-speed output data port are used in daisy-chaining the transceivers, and wherein when the individual transceiver is used as the corresponding transceiver in the individual group, one low-speed output data port is used in daisy-chaining the corresponding transceiver and the first drivers; and
the individual transceiver is configured to:
disconnect the high-speed output data port from the high-speed input data port at the initialization before any ID number is received at the high-speed input data port;
adopt any ID number first received by the high-speed input data port as the ID number assigned to the individual transceiver; and
connect the high-speed input data port and the high-speed output data port after the ID number assigned to the individual transceiver is received, thereby allowing subsequent ID numbers generated from the timing controller to pass to remaining transceivers for ID number assignment.

13. The display panel of claim 12, wherein:
the third number is two such that the individual transceiver is usable for directly relaying the pixel data to two different groups; and
the transceivers are positioned on the substrate such that the transceivers collectively divide the substrate into two portions, the individual transceiver being arranged to relay the pixel data to respective drivers in two different groups, the two different groups being respectively located on different portions of the substrate.

14. The display panel of claim 11, wherein:
an individual driver comprises an input data port and an output data port, wherein when the individual driver is one of the first drivers in the individual group, the input data port and the output data port are used in daisy-chaining the corresponding transceiver and the first drivers; and
the individual driver is configured to:
disconnect the output data port from the input data port at the initialization before any ID number is received at the input data port;
adopt any ID number first received by the input data port as the ID number assigned to the individual driver; and
connect the input data port and the output data port after the ID number assigned to the individual driver is received, thereby allowing subsequent ID numbers generated from the timing controller to pass to remaining first drivers in the individual group for ID number assignment.

15. A display panel comprising:
plural light-generating pixels;
plural drivers collectively used for driving the pixels according to pixel data, the pixel data being arranged to be generated by a timing controller;
plural transceivers collectively used for relaying the pixel data from the timing controller to the drivers, one of the transceivers being arranged to connect to the timing controller for receiving the pixel data; and
a substrate on which the pixels, the drivers and the transceivers are mounted;
wherein:
the drivers are divided into plural groups of drivers, first drivers in an individual group being arranged to receive corresponding pixel data addressed thereto solely from a corresponding transceiver selected from the transceivers;
the corresponding transceiver and the first drivers are daisy-chained and interconnected via a first number of one or more data lines to form a first linear daisy chain, the first drivers being daisy-chained by connecting each pair of immediately-adjacent first drivers to thereby enable transmission of the corresponding pixel data from the corresponding transceiver to the first drivers while reducing a data-line footprint on the substrate in comparison to a first star-topology arrangement of individually connecting the corresponding transceiver to each of the first drivers;
each of the first drivers is configured to decode the corresponding pixel data that are encoded by a run length limited (RLL) code; and
the transceivers are daisy-chained and interconnected via a second number of one or more data lines to form a second linear daisy chain, the transceivers being daisy-chained by connecting each pair of immediately-adjacent transceivers to thereby enable transmission of the pixel data from the timing controller to the transceivers while further reducing the data-line footprint on the substrate in comparison to a second star-topology arrangement of individually connecting the timing controller to each of the transceivers.

16. The display panel of claim 15, wherein the pixels, the drivers and the transceivers are mounted on a same side of the substrate.

17. The display panel of claim 15 further comprising:
the timing controller for generating the pixel data and for assigning an identification (ID) number to each one of the transceivers and the drivers at initialization of the display panel, the ID number being used by the timing controller as an address in delivering the pixel data.

18. A display panel comprising:
plural light-generating pixels;
plural drivers collectively used for driving the pixels according to pixel data, the pixel data being arranged to be generated by a timing controller;
plural transceivers collectively used for relaying the pixel data from the timing controller to the drivers, one of the transceivers being arranged to connect to the timing controller for receiving the pixel data;
the timing controller for generating the pixel data and for assigning an identification (ID) number to each one of the transceivers and the drivers at initialization of the display panel, the ID number being used by the timing controller as an address in delivering the pixel data; and
a substrate on which the pixels, the drivers and the transceivers are mounted;
wherein:
the drivers are divided into plural groups of drivers, first drivers in an individual group being arranged to receive corresponding pixel data addressed thereto solely from a corresponding transceiver selected from the transceivers;
the corresponding transceiver and the first drivers are daisy-chained and interconnected via a first number of one or more data lines to form a first linear daisy chain, the first drivers being daisy-chained by connecting each pair of immediately-adjacent first drivers to thereby enable transmission of the corresponding pixel data from the corresponding transceiver to the first drivers while reducing a data-line footprint on the substrate in comparison to a first star-topology arrangement of individually connecting the corresponding transceiver to each of the first drivers;
the transceivers are daisy-chained and interconnected via a second number of one or more data lines to form a second linear daisy chain, the transceivers being daisy-chained by connecting each pair of immediately-adjacent transceivers to thereby enable transmission of the pixel data from the timing controller to the transceivers while further reducing the data-line footprint on the substrate in comparison to a second star-topology arrangement of individually connecting the timing controller to each of the transceivers;
an individual driver comprises an input data port and an output data port, wherein when the individual driver is one of the first drivers in the individual group, the input data port and the output data port are used in daisy-chaining the corresponding transceiver and the first drivers; and
the individual driver is configured to:
disconnect the output data port from the input data port at the initialization before any ID number is received at the input data port;
adopt any ID number first received by the input data port as the ID number assigned to the individual driver; and
connect the input data port and the output data port after the ID number assigned to the individual driver is received, thereby allowing subsequent ID numbers generated from the timing controller to pass to remaining first drivers in the individual group for ID number assignment.

19. The display panel of claim 18, wherein each of the first drivers is configured to decode the corresponding pixel data that are encoded by a run length limited (RLL) code.

20. The display panel of claim 18, wherein the pixels, the drivers and the transceivers are mounted on a same side of the substrate.

* * * * *